US012734679B2

(12) United States Patent
Takagi

(10) Patent No.: US 12,734,679 B2
(45) Date of Patent: Sep. 15, 2026

(54) CONTINUOUS ROBOT CONTROL SYSTEM, CONTROL METHOD OF CONTINUOUS ROBOT, AND STORAGE MEDIUM

(71) Applicant: CANON KABUSHIKI KAISHA, Tokyo (JP)

(72) Inventor: Kiyoshi Takagi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/739,857

(22) Filed: Jun. 11, 2024

(65) Prior Publication Data

US 2024/0326236 A1 Oct. 3, 2024

Related U.S. Application Data

(63) Continuation of application No. PCT/JP2022/043284, filed on Nov. 24, 2022.

(30) Foreign Application Priority Data

Dec. 14, 2021 (JP) ................................. 2021-202839

(51) Int. Cl.
*B25J 9/06* (2006.01)
*B25J 9/16* (2006.01)

(52) U.S. Cl.
CPC ............. *B25J 9/065* (2013.01); *B25J 9/1664* (2013.01)

(58) Field of Classification Search
None
See application file for complete search history.

(56) References Cited

U.S. PATENT DOCUMENTS

2012/0271109 A1 10/2012 Belson
2016/0354924 A9 12/2016 Simaan
(Continued)

FOREIGN PATENT DOCUMENTS

CN 111761572 A * 10/2020 ............. B25J 17/00
EP 3839674 A1 6/2021
(Continued)

OTHER PUBLICATIONS

W. -B. Cheng and W. -J. Zhang, “Kinematics for continuum robot of the endoscope, ” 2013 IEEE International Conference on Robotics and Automation, Karlsruhe, Germany, 2013, pp. 5144-5148 (Year: 2013).*

(Continued)

*Primary Examiner* — Khoi H Tran
*Assistant Examiner* — Dairon Estevez
(74) *Attorney, Agent, or Firm* — Canon U.S.A., Inc., IP Division

(57) ABSTRACT

A continuous robot control system executes control which brings a continuous robot into a state where a most distal bending portion (leading bending portion) bends at a third bending angle between a bending angle b (second bending angle) and a bending angle e (first bending angle) with respect to a reference axis while a base is being located at a position between a position c (third position) and a position e (first position), when the distal bending portion is extracted from a tube by making the continuous robot move backward, after the distal bending portion is inserted into an inner portion of the tube by making the continuous robot move forward.

9 Claims, 18 Drawing Sheets

(56) References Cited

U.S. PATENT DOCUMENTS

| | | | | |
|---|---|---|---|---|
| 2017/0049298 | A1* | 2/2017 | Hunter | A61B 5/067 |
| 2018/0296282 | A1* | 10/2018 | Kose | A61B 1/0053 |
| 2019/0015978 | A1* | 1/2019 | Takagi | B25J 9/065 |
| 2020/0237198 | A1* | 7/2020 | Liu | A61B 1/00156 |
| 2021/0229277 | A1 | 7/2021 | Takagi | |
| 2024/0024047 | A1* | 1/2024 | Gerboni | A61B 34/30 |

FOREIGN PATENT DOCUMENTS

| | | | | |
|---|---|---|---|---|
| JP | 2003528677 | A | 9/2003 | |
| JP | 2018171701 | A | 11/2018 | |
| JP | 2018175602 | A | 11/2018 | |
| JP | 2019058648 | A | 4/2019 | |
| WO | WO-2010001107 | A2 * | 1/2010 | B25J 5/00 |

OTHER PUBLICATIONS

H. Khakpour, L. Birglen and S. -A. Tahan, "Synthesis of Differentially Driven Planar Cable Parallel Manipulators," in IEEE Transactions on Robotics, vol. 30, No. 3, pp. 619-630, Jun. 2014, (Year: 2014).*

H. Khakpour and L. Birglen, "Workspace augmentation of spatial 3-DOF cable parallel robots using differential actuation," 2014 IEEE/RSJ International Conference on Intelligent Robots and Systems, Chicago, IL, USA, 2014, pp. 3880-3885 (Year: 2014).*

* cited by examiner

230
KINEMATICS
$I_P$

220

200

210
MUX
211
2111
212
213
$\theta_L, \theta_F$
$\theta_L'$
$\theta_F'$ $\theta_L$
$Z_b$
310
330
340

(a)
(b)
(c)
(d)
(e)
(f)
(g)
(h)
(i)
(j)
(k)
170-e
170-(e-1)

(a)
(b)
(c)
(d)
(e)
(f)
(g)
(h)
(i)
(j)
(k)
170-e
170-(e-1)

CONTINUOUS ROBOT CONTROL SYSTEM, CONTROL METHOD OF CONTINUOUS ROBOT, AND STORAGE MEDIUM

CROSS-REFERENCE TO RELATED APPLICATIONS

This application is a Continuation of International Patent Application No. PCT/JP2022/043284, filed Nov. 24, 2022, which claims the benefit of Japanese Patent Application No. 2021-202839, filed Dec. 14, 2021, both of which are hereby incorporated by reference herein in their entirety.

BACKGROUND

Field of the Disclosure

The present disclosure relates to a continuous robot control system for controlling a continuous robot, a control method of the continuous robot, and a storage medium storing program for causing a computer to function as the continuous robot control system.

Background Art

A continuous robot, also called a continuum robot, includes a plurality of bending portions having flexible structures, and a shape the continuous robot is controlled by deforming the bending portions. The continuous robot mainly has two advantages over a rigid link robot including rigid links. Firstly, the continuous robot is advantageous in that the continuous robot can move along a curve in a narrow space or an environment with scattered objects where the rigid link robot may get stuck. Secondary, the continuous robot is advantageous in that the continuous robot can operate without damaging a fragile target object because the continuous robot has intrinsic softness. In this regard, implementation of external force detection, which is required for the rigid link robot, is not necessarily required. By taking these advantages of features, the continuous robot is expected to be applied to a medical field such as a sheath or a catheter of an endoscope and a robot operated in hazardous environments such as a rescue robot.

A patent document 1 discusses a control method for making a continuous robot serving as an endoscope intrude into a lumen. Specifically, according to the patent document 1, a shape of the endoscope is continuously propagated to all of pairs of bending portions next to each other by executing control for applying a bending shape of a preceding bending portion to a bending shape of a succeeding bending portion in tandem with forward movement of a base of the endoscope.

CITATION LIST

Patent Literature

PTL 1: US Published Application No. 2012-0271109

The patent document 1 discusses a technique relating to control for making a bending shape of the preceding bending portion be propagated to the succeeding bending portion every time the base of the continuous robot serving as the endoscope moves forward by a length of the bending portion. However, with the technique discussed in the patent document 1, there is a possibility that the continuous robot is damaged by being in contact with an inner wall of a lumen if the continuous robot moves backward after moving forward without controlling posture thereof.

SUMMARY θF THE DISCLOSURE

The present disclosure has been made in view of the above-described drawbacks, and the present disclosure is directed to providing a system capable of preventing a continuous robot from being damaged when the continuous robot moves backward after moving forward.

A continuous robot control system that executes control of a continuous robot includes a base, a distal bending portion configured to bend by driving of distal linear members, a driving unit configured to drive each of the distal linear members, and joining portions arranged between the distal bending portion and the base, the continuous robot control system includes a moving unit configured to make the continuous robot move forward and backward, and a control unit configured to control the continuous robot to bring the continuous robot into a fourth state where the distal bending portion bends at a third bending angle between a second bending angle and a first bending angle with respect to a reference axis while the base is being located at a position between a third position and a first position, when the distal bending portion is extracted from a tube by making the continuous robot move backward, after the distal bending portion is inserted into an inner portion of the tube by changing a state of the continuous robot in order of a first state where the distal bending portion bends at the first bending angle with respect to the reference axis while the base of the continuous robot is being located at the first position, a second state where the distal bending portion bends at the second bending angle different from the first bending angle with respect to the reference axis while the base is being located at a second position by moving forward from the first position, and a third state where the base is located at the third position by moving forward from the second position.

Further, the present disclosure includes a control method of a continuous robot implemented by the above-described continuous robot control system and a program for causing a computer to function as respective units of the above-described continuous robot control system.

Further features of the present disclosure will become apparent from the following description of exemplary embodiments with reference to the attached drawings.

BRIEF DESCRIPTION θF THE DRAWINGS

FIG. 4 is a diagram illustrating an example of a schematic configuration of a continuous robot control system according to the first exemplary embodiment of the present disclosure.

DESCRIPTION ΘF THE EMBODIMENTS

Hereinafter, embodiments (exemplary embodiments) for implementing the present disclosure are described with reference to drawings.

First Exemplary Embodiment

First, a first exemplary embodiment of the present disclosure will be described.

Figure 1:
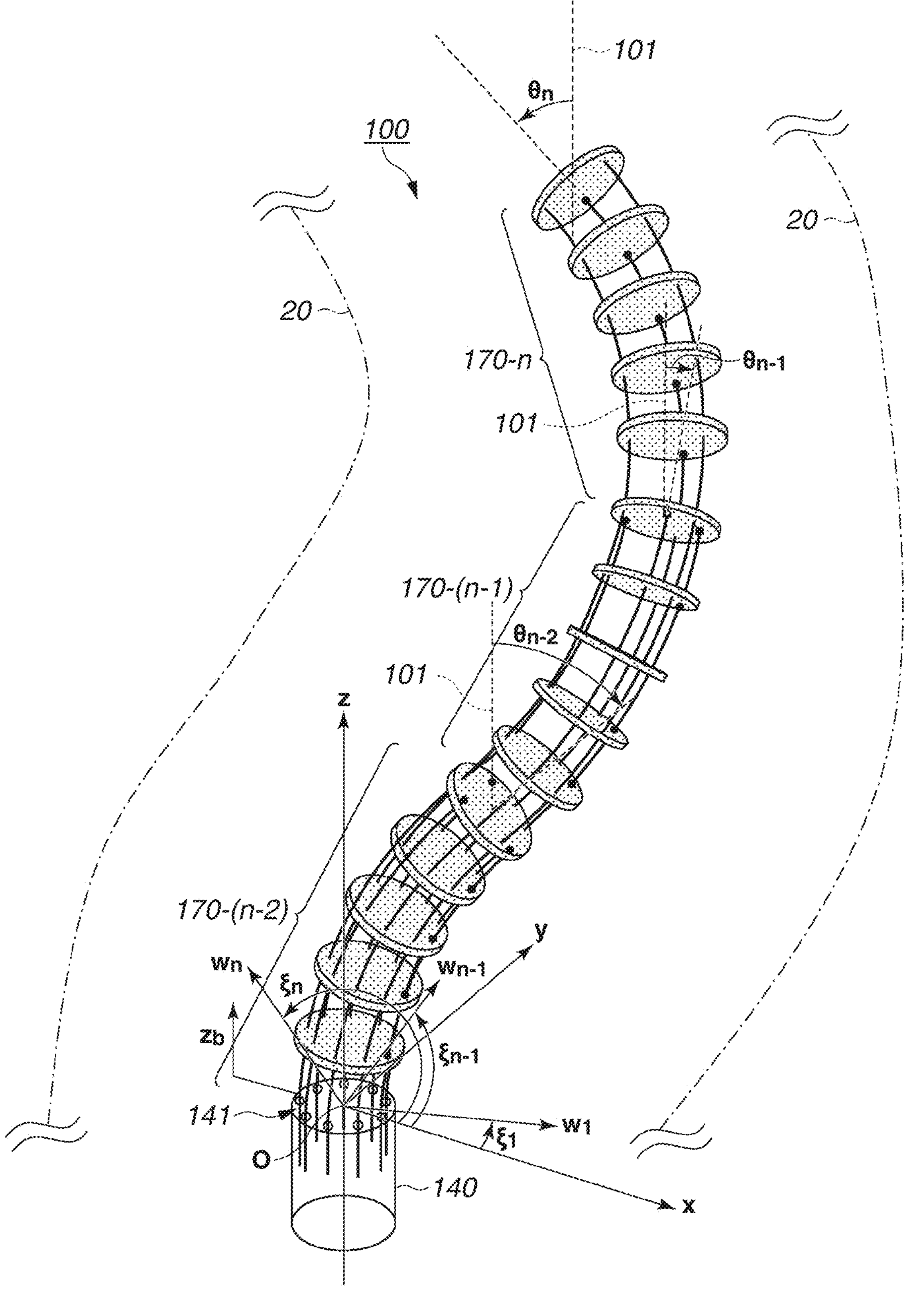
FIG. 1 is a diagram illustrating an example of a schematic configuration of a continuous robot according to a first exemplary embodiment of the present disclosure.

FIG. 1 is a diagram illustrating an example of a schematic configuration of a continuous robot 100 according to the first exemplary embodiment of the present disclosure. In FIG. 1, a base 140 and a plurality of bending portions (also called "bending section") 170 are illustrated as ordinary constituent elements of the continuous robot 100. Specifically, in the example in FIG. 1, n pieces of bending portions, i.e., a bending portion 170-($n$−2), a bending portion 170-($n$−1), and a bending portion 170-$n$, are illustrated, in the order from a side of the base 140. FIG. 1 also illustrates an xyz coordinate system which takes an origin O at a prescribed position (e.g., a central position) in an upper surface 141 of the base 140, and specifies a traveling direction of the continuous robot 100 (e.g., a direction of forward movement) as a z direction and directions orthogonal to the z direction and orthogonal to each other as an x direction and a y direction. FIG. 1 further illustrates a tube 20 corresponding to a pathway, through which the continuous robot 100 is inserted by making the continuous robot 100 move forward and extracted by making the continuous robot 100 move backward. For example, a digestive canal or a trachea is applicable to the tube 20 when the continuous robot 100 is used in a medical field. Further, for example, a pipe is applicable to the tube 20 when the continuous robot 100 is used in an industrial field. However, application examples are not limited thereto.

Each of the bending portions 170 illustrated in FIG. 1 bends by driving of wires as linear members arranged for each of the bending portions. The bending portion 170-$n$ in FIG. 1 is a distal bending portion (most distal bending portion) located more distal to the base 140 than the bending portion 170-($n$−1) and the bending portion 170-($n$−2). Further, the bending portion 170-$n$ is a leading bending portion in a direction (+z direction) the continuous robot 100 moves forward. The bending portion 170-($n$−1) in FIG. 1 is a first following bending portion which follows the bending portion 170-$n$ arranged as a leading bending portion in the direction (+z direction) the continuous robot 100 moves forward. The bending portion 170-($n$−2) in FIG. 1 is a second following bending portion which follows the bending portion 170-$n$ and the bending portion 170-($n$−1) in the direction (+Z direction) the continuous robot 100 moves forward. Further, in FIG. 1, the bending portion 170-($n$−1)

and the bending portion 170-($n$−2) correspond to joining portions arranged between the bending portion 170-$n$ arranged as a distal bending portion (most distal bending portion) and the base 140.

Further, in FIG. 1, a bending angle of a distal end of the bending portion 170-$n$ with respect to a reference axis 101 parallel to the z direction (simply called "a bending angle of the bending portion 170-$n$") is expressed by $\theta_n$. Further, in FIG. 1, a bending angle of a distal end of the bending portion 170-($n$−1) with respect to the reference axis 101 parallel to the z direction (simply called "a bending angle of the bending portion 170-($n$−1)") is expressed by $\theta_{n-1}$. Furthermore, in FIG. 1, a bending angle of a distal end of the bending portion 170-($n$−2) with respect to the reference axis 101 parallel to the z direction (simply called "a bending angle of the bending portion 170-($n$−2)") is expressed by $\theta_{n-2}$.

The base 140 is a constituent element which supports the plurality of bending portions 170, and actuators (not illustrated in FIG. 1) serving as driving units for driving the wires provided for each of the bending portions 170-$n$ to 170-($n$−2) are arranged on the inner portion of the base 140.

The continuous robot 100 can move forward (+z direction) and backward (−z direction) in the z direction in addition to executing bending operation of the plurality of bending portions 170. In this regard, in FIG. 1, a displacement $z_b$ of the base 140 is illustrated as an index for indicating a moving amount in the z direction of the continuous robot 100.

Figure 2:
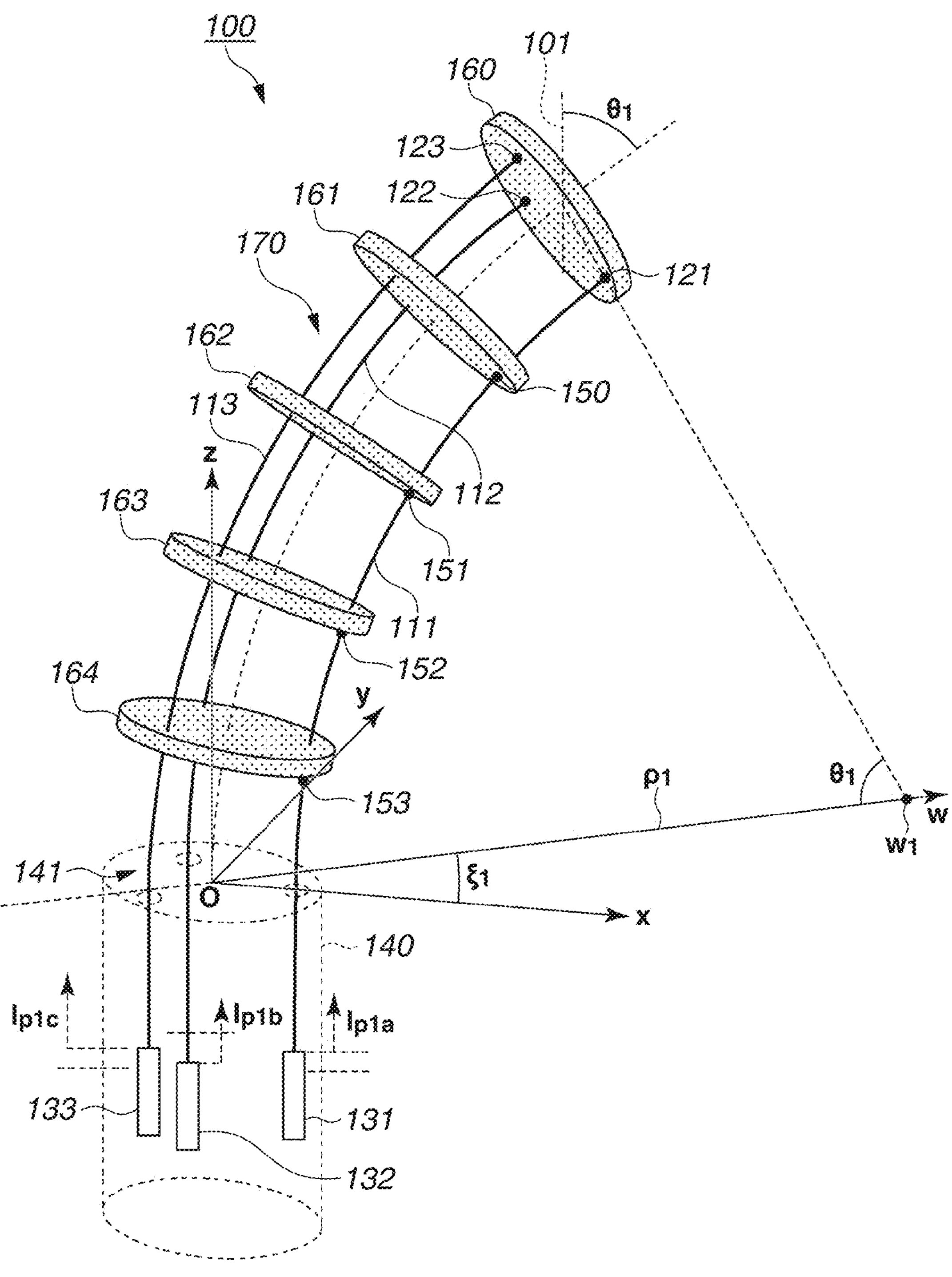
FIG. 2 is a diagram illustrating an example of a detailed schematic configuration of one of bending portions included in the schematic configuration of the continuous robot illustrated in FIG. 1.

FIG. 2 is a diagram illustrating an example of a detailed schematic configuration of one of the bending portions 170 included in the schematic configuration of the continuous robot 100 illustrated in FIG. 1. Specifically, in FIG. 2, a detailed schematic configuration of the bending portion 170-($n$−2) of a proximal end, located at a position closest to the base 140 is illustrated from among the plurality of bending portions 170 in FIG. 1. In FIG. 2, the same reference numerals are applied to the constituent elements similar to those illustrated in FIG. 1, and detailed descriptions thereof are omitted. Further, in FIG. 2, a bending angle of the bending portion 170 with respect to the reference axis 101 parallel to the z direction is expressed by $\theta_1$, a turning angle of the bending portion 170 is expressed by $\zeta_1$, and a curvature radius of the bending portion 170 (corresponding to a line segment which connects the origin O and a point $w_1$ in FIG. 2) is expressed by $\rho_1$.

Further, in FIG. 1, a turning angle of the bending portion 170-$n$ is expressed by $\zeta_n$, a turning angle of the bending portion 170-($n$−1) is expressed by $\zeta_{n-1}$, and a turning angle of the bending portion 170-($n$−2) is expressed by $\zeta_1$.

As illustrated in FIG. 2, wires 111 to 113 provided as linear members are respectively connected to connection portions 121 to 123 of a distal end 160 of the bending portion 170 of the continuous robot 100. Actuators 131 to 133 arranged on the inner portion of the base 140 respectively push and pull these wires 111 to 113, thereby causing a posture (bending shape) to be controlled. Herein, the actuator 131 is a driving unit for driving the wire 111, the actuator 132 is a driving unit for driving the wire 112, and the actuator 133 is a driving unit for driving the wire 113.

Further, as illustrated in FIG. 2, the continuous robot 100 includes wire guides 161 to 164 as the members for guiding the wires 111 to 113 as the linear members of the bending portion 170. A continuous member such as a pleated member or a mesh-like member may be used for the wire guides 161 to 164 instead of arranging a plurality of discrete members. The wire 111 is fixed to the wire guides 161 to 164 at each of fixed portions 150 to 153. Further, in FIG. 2, a central axis of the continuous robot 100 passing through the origin O is indicated by a dashed line.

Further, in the present exemplary embodiment, the wires 111 to 113 are called a wire a, a wire b, and a wire c in a counterclockwise direction in an xy plane. Specifically, in the example illustrated in FIG. 2, the wire 111 corresponds to the wire a, and a driving displacement of the wire 111, caused by pushing/pulling operation of the actuator 131 of the bending portion 170, is expressed by $l_{p1a}$. Further, in the example illustrated in FIG. 2, the wire 112 corresponds to the wire b, and a driving displacement of the wire 112, caused by pushing/pulling operation of the actuator 132 of the bending portion 170, is expressed by $l_{p1b}$. Furthermore, in the example illustrated in FIG. 2, the wire 113 corresponds to the wire c, and a driving displacement of the wire 113, caused by pushing/pulling operation of the actuator 133 of the bending portion 170, is expressed by $l_{p1c}$. Herein, as generalized expressions, driving displacements of wires for driving the n-th bending portion ("n" is a positive integer) are expressed by $l_{pna}$, $l_{pnb}$, and $l_{pnc}$.

In the example illustrated in FIG. 2, only a detailed schematic configuration of the bending portion 170 corresponding to the bending portion 170-($n$−2) in FIG. 1 is illustrated and described. In this regard, each of the bending portion 170-($n$−1) and the bending portion 170-$n$ in FIG. 1 also includes the configuration similar to the detailed schematic configuration of the bending portion 170 in FIG. 2, corresponding to the bending portion 170-($n$−2) in FIG. 1. In other words, each of the bending portions 170-($n$−1) and 170-$n$ includes wires corresponding to the wires 111 to 113, actuators corresponding to the actuators 131 to 133, a distal end corresponding to the distal end 160, and wire guides corresponding to the wire guides 161 to 164. For example, the bending portion 170-$n$, provided as the most distal bending portion (leading bending portion) in FIG. 1, includes wires corresponding to the wires 111 to 113 in FIG. 2 as the most distal linear members, and the bending portion 170-$n$ bends when the wires are driven by the actuators serving as the driving units. Further, for example, the bending portion 170-($n$−1), provided as the first following bending portion in FIG. 1, includes wires corresponding to the wires 111 to 113 in FIG. 2 as the first following linear members, and the bending portion 170-($n$−1) bends when the wires are driven by the actuators serving as the driving units. Then, the bending portion 170-($n$−2), provided as the second following bending portion in FIG. 1, includes wires 111 to 113 in FIG. 2 as the second following linear members, and the bending portion 170-($n$−2) bends when the wires 111 to 113 are driven by the actuators 131 to 133 serving as the driving units. In other words, the continuous robot 100 illustrated in FIG. 1 includes actuators as the driving units which independently drive the wires as the most distal linear members, the wires as the first following linear members, and the wires as the second following linear members.

Figure 3:
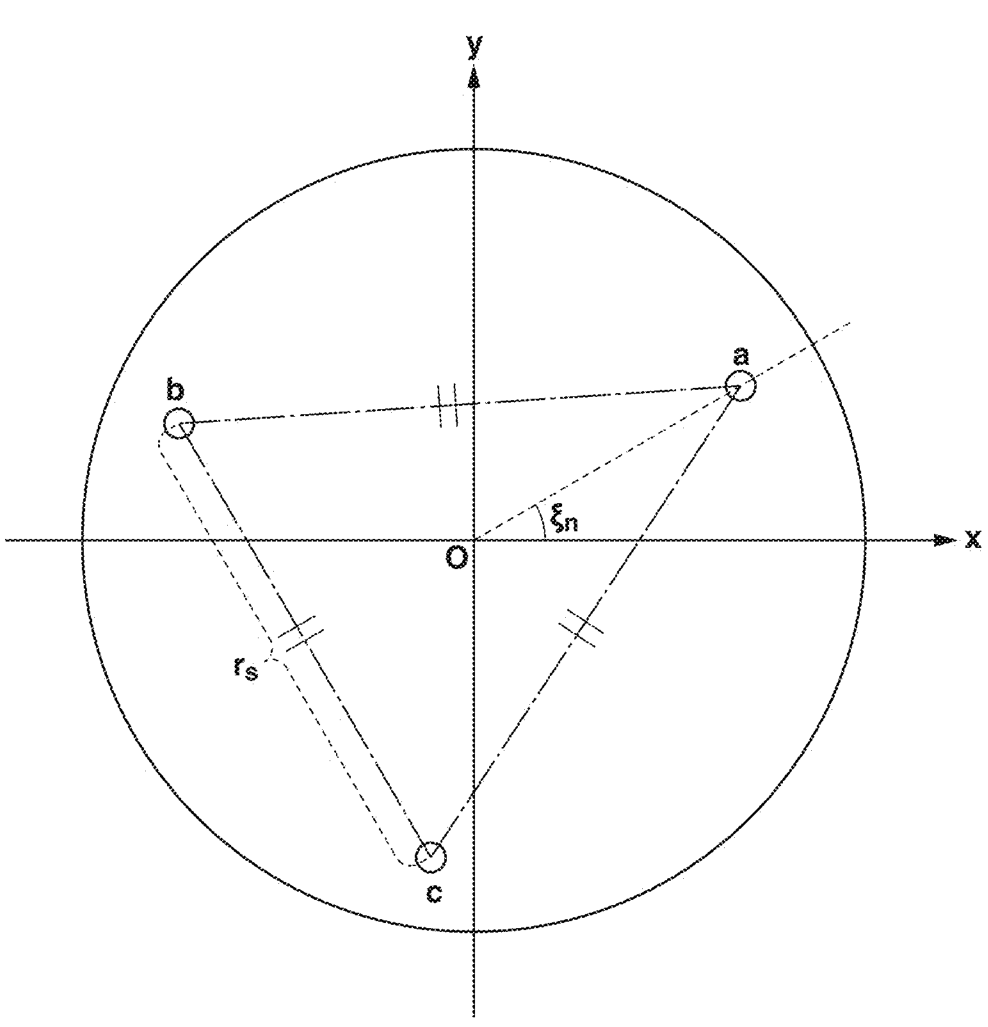
FIG. 3 is a diagram illustrating an arrangement example of three wires in FIG. 2 in an xy plane.

FIG. 3 is a diagram illustrating an arrangement example of the three wires 111 to 113 (wires a to c) in FIG. 2 in the xy plane. As illustrated in FIG. 3, the three wires 111 to 113 (wires a to c) in FIG. 2 are arranged on vertices of an equilateral triangle whose length of one side is expressed by $r_s$, and a phase angle $\xi_n$ in FIG. 3 is an angle which determines the arrangement of the wires for driving the n-th bending portion.

Figure 4:
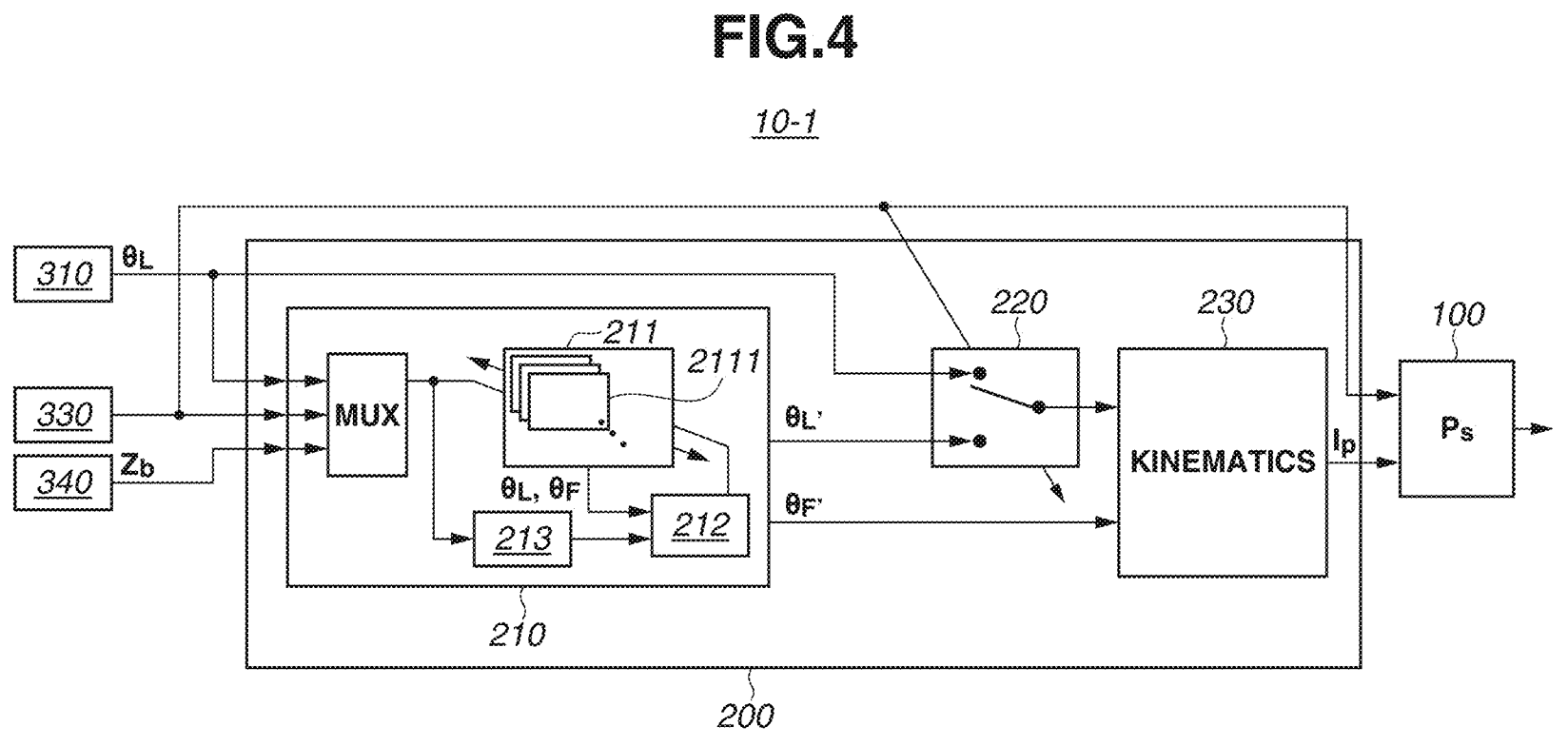

FIG. 4 is a diagram illustrating an example of a schematic configuration of a continuous robot control system 10-1 according to the first exemplary embodiment of the present disclosure. This continuous robot control system 10-1 is a system which executes control of the continuous robot 100 illustrated in FIGS. 1 and 2. As illustrated in FIG. 4, the continuous robot control system 10-1 includes the continuous robot 100, a control apparatus 200, and various input apparatuses 310, 330, and 340.

In the example illustrated in FIG. 1, the input apparatus 310 is an apparatus for inputting a target bending angle $\theta_L$ of the bending portion 170-*n*, which is the most distal bending portion (leading bending portion), to the control apparatus 200.

The input apparatus 330 is an apparatus for inputting a displacement $z_b$ of the base 140 indicating a moving amount of the continuous robot 100 in the z direction, and executing control for making the base 140 of the continuous robot 100 move by only the displacement $z_b$ in the z direction. Herein, the input apparatus 330 which executes control for making the base 140 of the continuous robot 100 move only by the displacement $z_b$ in the z direction constitutes "a moving unit" for making the continuous robot 100 move by only the displacement $z_b$ in the z direction (the movement in the +z, direction is forward movement, and the movement in the −z direction is backward movement).

The input apparatus 340 is an apparatus for inputting various types of information to the control apparatus 200. Specifically, for example, in the example illustrated in FIG. 1, the input apparatus 340 inputs information about the lengths l of the plurality of bending portions 170-*n* to 170-(*n*−2) and instruction information about use of a reference table 2111 to the control apparatus 200.

As illustrated in FIG. 4, the control apparatus 200 includes an angle calculation unit 210, a switching unit 220, and a kinematics calculation unit (Kinematics) 230.

A target bending angle $\theta_L$ of the most distal bending portion (leading bending portion) is input to the angle calculation unit 210 from the input apparatus 310, a displacement $z_b$ of the base 140 is input to the angle calculation unit 210 from the input apparatus 330, and information about the lengths l of the plurality of bending portions 170 is input to the angle calculation unit 210 from the input apparatus 340. Then, based on the input information, the angle calculation unit 210 calculates a target bending angle $\theta_F$ of the following bending portion (e.g., the above-described first following bending portion) and a target bending angle $\theta_F'$ of the following bending portion changed depending on change of the target bending angle $\theta_L$ of the most distal bending portion (leading bending portion). Further, the angle calculation unit 210 stores the target bending angle $\theta_L$ of the most distal bending portion (leading bending portion) and the target bending angle $\theta_F$ of the following bending portion, and calculates a target bending angle $\theta_L'$ of the most distal bending portion when the base 140 of the continuous robot 100 moves backward.

As illustrated in FIG. 4, the angle calculation unit 210 includes a multiplexer (MUX), a storage unit 211, a reference table rewriting unit 212, and an information input unit 213. The multiplexer (MUX) is a constituent element which receives a plurality of pieces of input information from external apparatuses and outputs a piece of information (signal) by selecting and organizing the plurality of pieces of input information. The storage unit 211 stores a plurality of different reference tables 2111 describing a relationship between the target bending angle $\theta_L$ of the most distal bending portion (leading bending portion) and the displacement $z_b$ of the base 140 and a relationship between the target bending angle $\theta_F$ of the following bending portion and the displacement $z_b$ of the base 140, and various types of information necessary for the angle calculation unit 210 to execute processing. The information input unit 213 inputs the information about the lengths l of the plurality of bending portions 170 and the instruction information about use of the reference table 2111, received from the input apparatus 340, to the reference table rewriting unit 212. Based on the information received from the information input unit 213, the reference table rewriting unit 212 selects one reference table 2111 to be used from the plurality of reference tables 2111 stored in the storage unit 211. Then, the reference table rewriting unit 212 rewrites the selected reference table 2111 depending on change of the target bending angle $\theta_L$ of the most distal bending portion (leading bending portion), change of the target bending angle $\theta_F$ of the following bending portion, and change of the displacement $z_b$ of the base 140.

The switching unit 220 switches a target bending angle of the most distal bending portion (leading bending portion) between the target bending angle $\theta_L$ received from the input apparatus 310 and the target bending angle $\theta_L'$ calculated by the angle calculation unit 210 depending on a traveling direction of the displacement $z_b$ of the base 140. Specifically, in the present exemplary embodiment, the switching unit 220 selects the target bending angle $\theta_L$ received from the input apparatus 310 to switch the target bending angle in a case where the traveling direction of the displacement $z_b$ of the base 140 is a direction of the forward movement. Further, the switching unit 220 selects the target bending angle $\theta_L'$ calculated by the angle calculation unit 210 to switch the target bending angle in a case where the traveling direction of the displacement $z_b$ of the base 140 is a direction of the backward movement.

Information about the target bending angle ($\theta_L$ or OL') of the most distal bending portion (leading bending portion) output from the switching unit 220 and information about the target bending angle $\theta_F'$ of the following bending portion calculated by the angle calculation unit 210 are input to the kinematics calculation unit 230. Then, based on the input information, the kinematics calculation unit 230 calculates driving displacements caused by driving of wires of the most distal bending portion (leading bending portion) and the following bending portion, executed by respective actuators as driving units. In FIG. 4, driving displacements of the wires of the most distal bending portion (leading bending portion) and driving displacements of the wires of the following bending portion acquired through the calculation executed by the kinematics calculation unit 230 are collectively expressed as the driving displacements $l_p$ of wires. Then, depending on the driving displacements $l_p$ of respective wires, bending control of the most distal bending portion (leading bending portion) and the following bending portion is executed on the continuous robot 100 according to the present exemplary embodiment.

In the present exemplary embodiment, first, leader follow-up control in the xz plane will be described while all of the phase angles (FIG. 3) are specified as $\xi_n=0$.

1) Modeling

In this chapter, kinematics of the continuous robot 100 in the xz plane are derived. Definitions of symbols are described as follows.

$l_n$: A length of the n-th bending portion (arm housing).

$r_n$: A distance from a wire passing through a wire guide of the n-th bending portion to a center of the wire guide.

e: The number of bending portions of the continuous robot 100.

$\theta_n$: A bending angle (of a distal end) of the n-th bending portion.

$p_n$: A curvature radius of the n-th bending portion.

$\theta_{refn}$: A target bending angle (of a distal end) of the n-th bending portion.

$l_{pn}$: A driving displacement of a wire of the n-th bending portion.

$x_{tn}$, $z_n$: Coordinates of a distal end of the n-th bending portion.

$z_b$: A displacement of the base 140.

Figure 5:
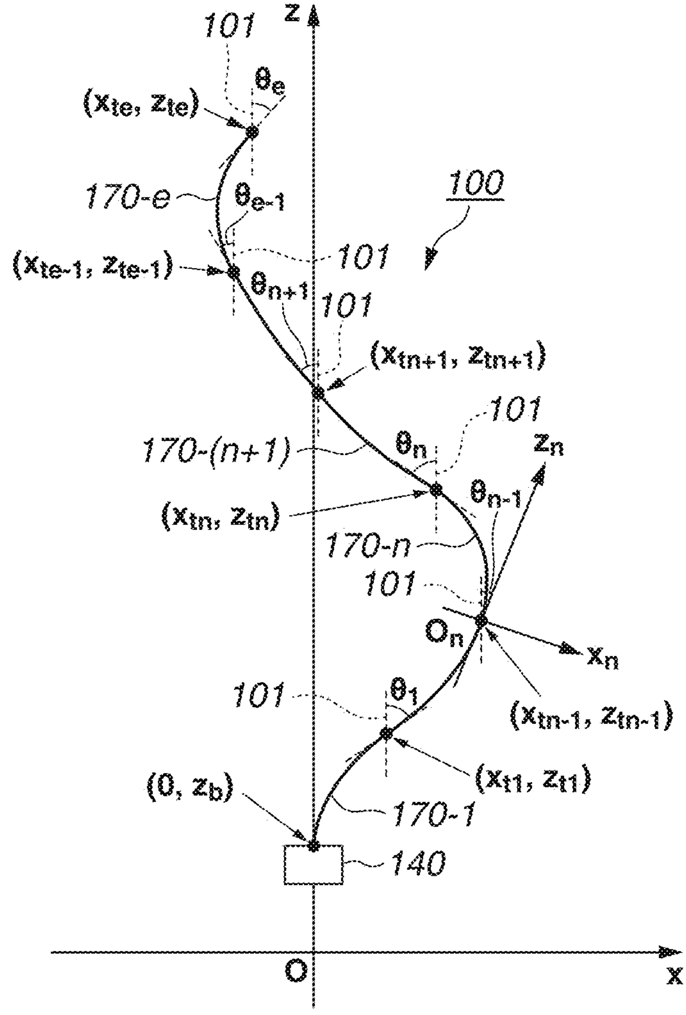
FIG. 5 is a diagram illustrating an example of a schematic configuration of the continuous robot according to the first exemplary embodiment of the present disclosure.

FIG. 5 is a diagram illustrating an example of a schematic configuration of the continuous robot 100 according to the first exemplary embodiment of the present disclosure. In FIG. 5, the same reference numerals are applied to the constituent elements similar to those illustrated in FIGS. 1 and 2, and detailed descriptions thereof are omitted. In the present exemplary embodiment, the number of bending portions 170 is specified as e, and kinematics of the continuous robot 100 illustrated in FIG. 5 are derived based on the following assumptions. In the continuous robot 100 illustrated in FIG. 5, the e-th bending portion 170-*e* is the most distal bending portion located most distal to the base 140, and the e-th bending portion 170-*e* is arranged as a leading bending portion in a direction the continuous robot 100 moves forward (i.e., the +z direction).

1. Wires are deformed only within the xz plane.
2. In each of bending portions, wires are deformed at constant curvatures.
3. Torsional deformation of wires is not taken into consideration.
4. Wires are not deformed in a lengthwise direction.

First, only the first bending portion 170-1 in FIG. 5 is considered.

When the wire a is driven and the wires b and c are fixed, a relationship between the driving displacement $l_{p1}$ of the wire and the bending angle $\theta_1$ of the first bending portion 170-1 is expressed by the following formula (1).

[Formula 1]

$$l_{p1} = \frac{3}{2} r_1 \theta_1 \tag{1}$$

Next, a relationship between the driving displacement $l_{pn}$ of the wires of the n-th bending portion 170-*n* in FIG. 5 and the bending angle $\theta_n$ of a distal end thereof is derived. Herein, "n" is an integer greater than or equal to 2. A relative bending angle $\theta\sim_n$ of the n-th bending portion 170-*n* is defined as expressed by the following formula (2).

$$\theta\sim_n = \theta_n - \theta_{n-1} \tag{2}$$

Figure 6:
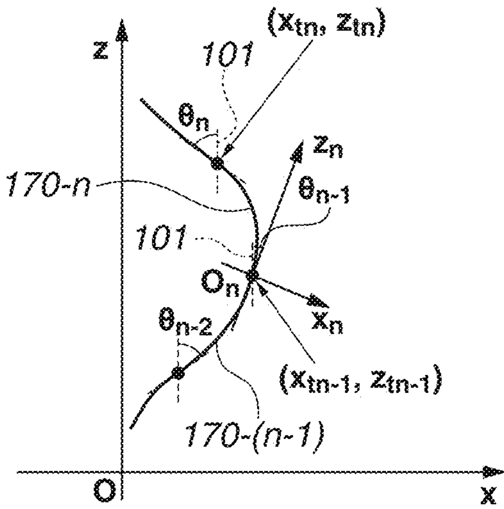
FIG. 6 is a diagram illustrating an extracted portion of the n-th bending portion illustrated in FIG. 5.

FIG. 6 is a diagram illustrating an extracted portion of the n-th bending portion 170-*n* illustrated in FIG. 5. As illustrated in FIG. 6, the origin O of the n-th bending portion 170-*n* is specified as $(x_{tn-1}, z_{tn-1})$, and a relative coordinate system $x_n$-$z_n$ consists of a $\theta_{n-1}$ direction and a direction orthogonal to the $\theta_{n-1}$ direction. In this regard, a relationship between the driving displacement $1\sim_{pn}$ of the wires and the relative bending angle $\theta\sim_n$ of the n-th bending portion 170-*n* in the relative coordinate system $x_n$-$z_n$ is expressed by the following formula (3).

[Formula 2]

$$\tilde{l}_{pn} = \frac{3}{2} r_n \tilde{\theta}_n \tag{3}$$

Further, the driving displacement $l_{pn}$ of the wires of the n-th bending portion is a sum of displacement of the wires for driving the n-th bending portion 170-*n* in the relative coordinate system of the first bending portion 170-1 to the (n−1)-th bending portion 170-(*n*−1), and the driving displacement $l_{pn}$ is expressed by the following formula (4).

[Formula 3]

$$l_{pn} = \frac{3}{2} r_n \left(\tilde{\theta}_n + \tilde{\theta}_{n-1} + \ldots + \theta_1\right) = r_n \theta_n \tag{4}$$

This implies that the bending angle $\theta_n$ of the n-th bending portion 170-*n* is determined only by the driving displacement $l_{pn}$ of the wires, and does not depend on the bending angles of intermediate bending portions 170.

Next, a relationship between the bending angle $\theta_n$ (of a distal end) of the n-th bending portion 170-*n* and coordinates of the distal end will be described.

First, a relationship between the bending angle $\theta_1$ (of a distal end) of the first bending portion 170-1 and the coordinates $(x_{t1}, z_{t1})$ of the distal end are expressed by the following formulas (5) and (6).

[Formula 4]

$$x_{t1} = \frac{l_1}{\theta_1}(1 - \cos\theta_1) \tag{5}$$

$$z_{t1} = \frac{l_1}{\theta_1}\sin\theta_1 \tag{6}$$

Next, a relationship between the bending angle $\theta_n$ (of a distal end) of the n-th bending portion 170-*n* and coordinates of the distal end is derived. Herein, "n" is a value of 2 or greater. The coordinates $(x\sim_{tn}, z\sim_{tn})$ of the distal end of the n-th bending portion 170-*n* in the relative coordinate system $x_n$-$z_n$ are expressed by the following formulas (7) and (8).

[Formula 5]

$$\tilde{x}_{tn} = \frac{l_n}{\tilde{\theta}_n}\left(1 - \cos\tilde{\theta}_n\right) \tag{7}$$

$$\tilde{z}_{tn} = \frac{l_n}{\tilde{\theta}_n}\sin\tilde{\theta}_n \tag{8}$$

Therefore, the coordinates $(x_{tn}, z_{tn})$ of the distal end of the n-th bending portion 170-*n* in the absolute coordinate system can be expressed by the following formula (9) using a rotational conversion matrix.

[Formula 6]

$$\begin{bmatrix} x_{tn} \\ z_{tn} \end{bmatrix} = \begin{bmatrix} x_{t1} \\ z_b + z_{t1} \end{bmatrix} + \sum_{m=2}^{n} \begin{bmatrix} \cos\theta_{m-1} & \sin\theta_{m-1} \\ -\sin\theta_{m-1} & \cos\theta_{m-1} \end{bmatrix} \begin{bmatrix} \frac{l_m}{\tilde{\theta}_m}\left(1 - \cos\tilde{\theta}_m\right) \\ \frac{l_m}{\tilde{\theta}_m}\sin\tilde{\theta}_m \end{bmatrix} \tag{9}$$

Figure 7A:
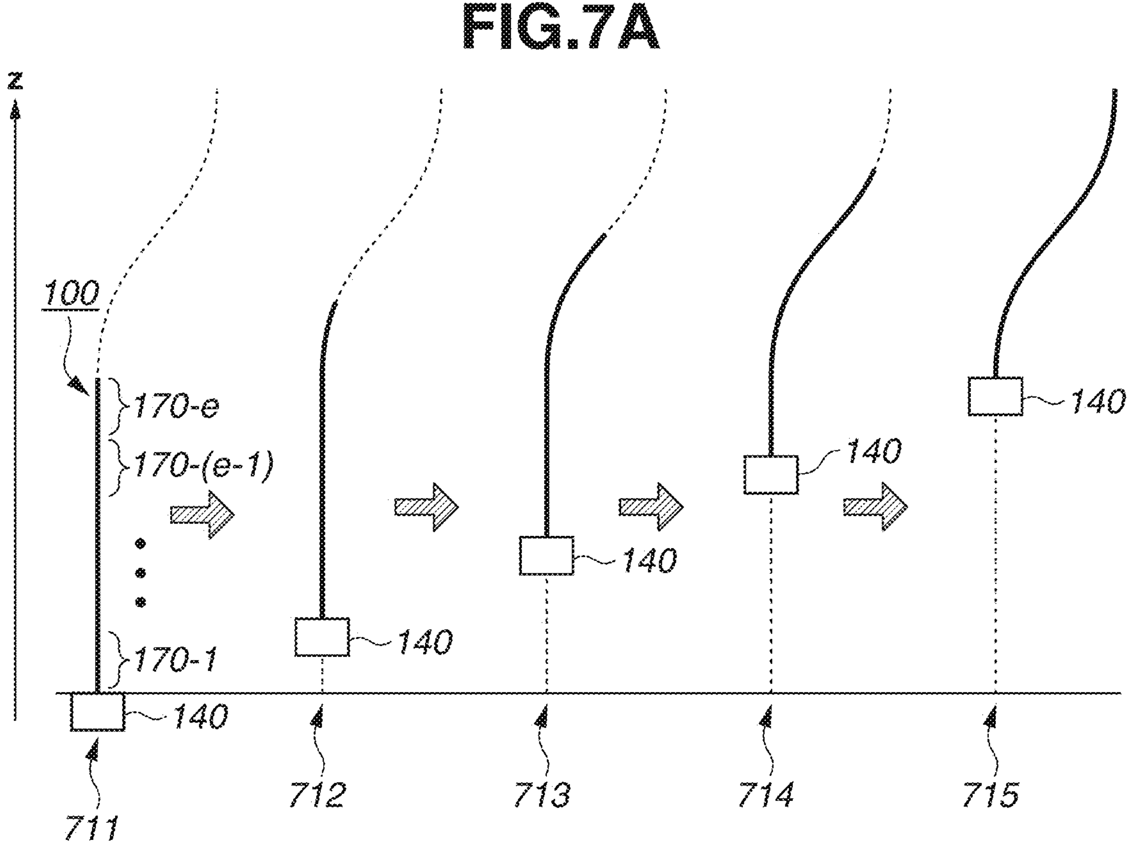
FIG. 7A is a diagram illustrating leader follow-up control of the continuous robot executed by a control apparatus illustrated in FIG. 4.
Figure 7B:
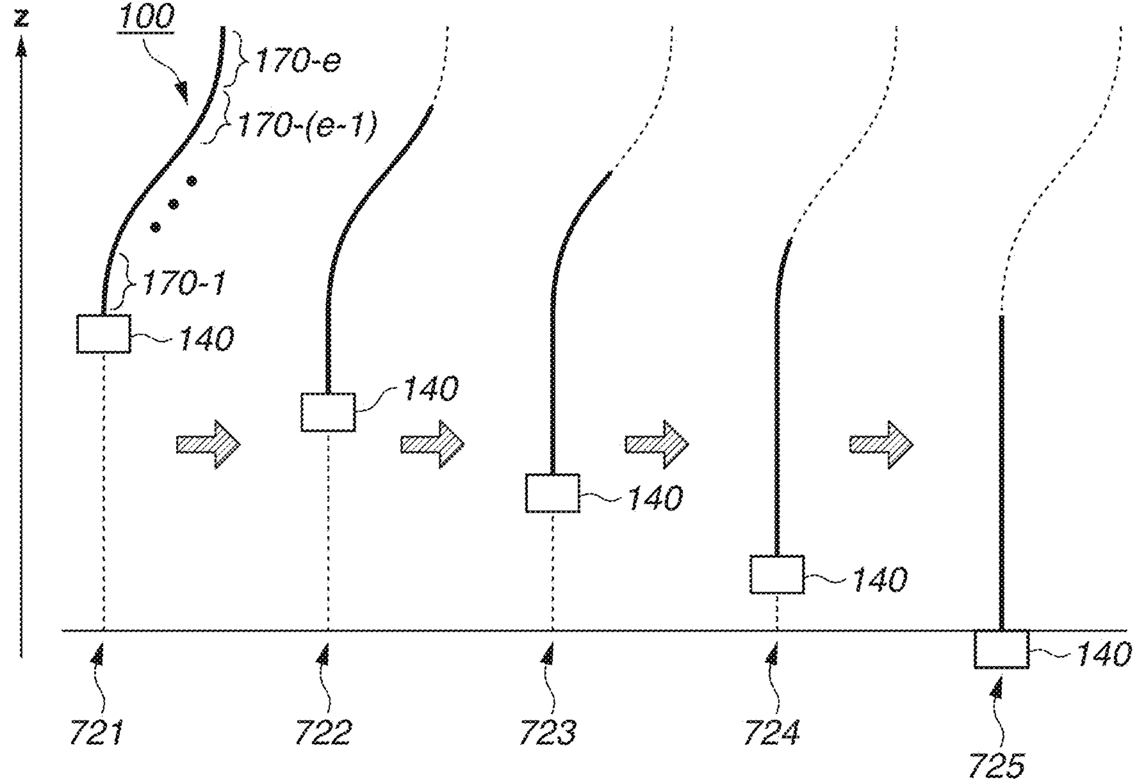
FIG. 7B is a diagram illustrating tail follow-up control of the continuous robot executed by the control apparatus illustrated in FIG. 4.

Next, leader follow-up control and tail follow-up control of the continuous robot 100 executed by the control apparatus 200 will be described. FIGS. 7A and 7B are diagrams illustrating leader follow-up control and tail follow-up control of the continuous robot 100 executed by the control apparatus 200 in FIG. 4. Specifically, FIG. 7A is a diagram illustrating the leader follow-up control, and FIG. 7B is a diagram illustrating the tail follow-up control. In FIGS. 7A and 7B, descriptions are provided based on the continuous robot 100 illustrated is FIG. 5. In other words, in the descriptions of FIGS. 7A and 7B, it is assumed that the e-th bending portion 170-*e* corresponds to the most distal bending portion (leading bending portion), and the (e−1)-th bending portion 170-(*e*−1) corresponds to a following bending portion which follows the e-th bending portion 170-*e*. Therefore, in FIGS. 7A and 7B, the same reference numerals are applied to the constituent elements similar to those illustrated in FIG. 5, and detailed descriptions thereof are omitted.

2) Leader Follow-Up Control

In this chapter, a leader follow-up control system will be described.

Herein, leader follow-up control refers to a control method for making the (e−1)-th bending portion 170-(*e*−1), which is a following bending portion, pass through the same pathway as that indicated by a dotted line, where the e-th bending portion 170-*e*, which is the most distal bending portion (leading bending portion), passes through as illustrated in FIG. 7A. Through the method, when the continuous robot 100 sequentially moves forward as illustrated in states 711 to 715 in FIG. 7A, the continuous robot 100 can weave through the internal space of the tube 20 while moving forward. It is not essentially required to previously set a pathway for the leader follow-up control. For example, a bending angle $\theta_e$ of the e-th bending portion 170-*e*, which is the most distal bending portion (leading bending portion), may continuously be propagated to the following bending portion with the length l of the bending portion. By employing this method, an operator can perform the leader follow-up control of the continuous robot 100 in an actual time by issuing instructions with respect to only a bending angle of the most distal bending portion (leading bending portion) and a moving amount in the z direction of the base 140 via the input apparatuses 310 and 330.

Figure 8A:
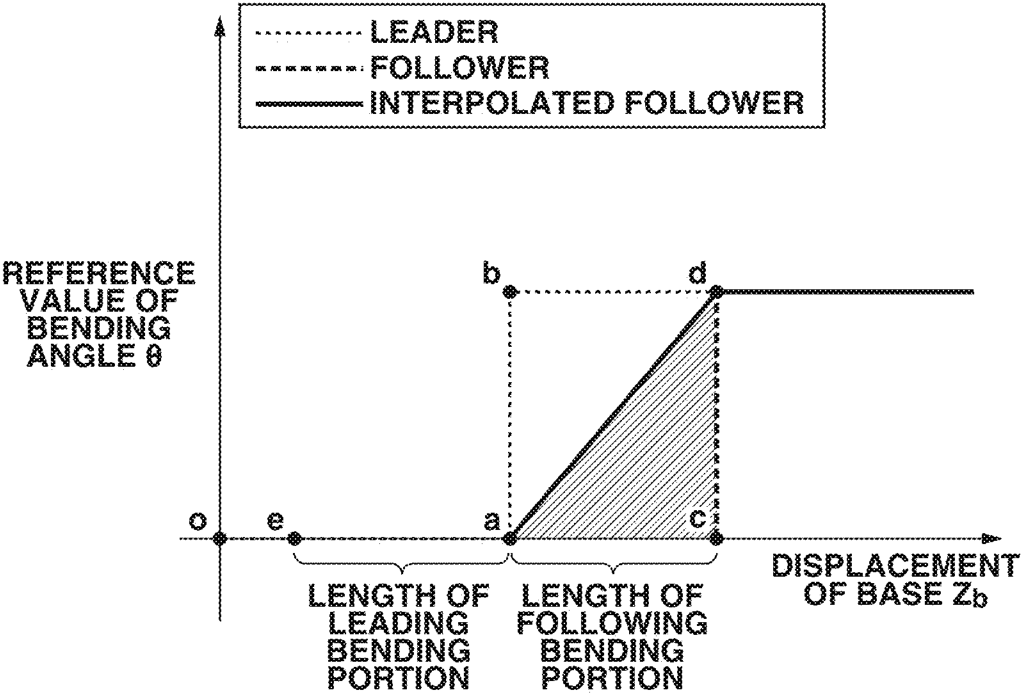
FIG. 8A is a diagram illustrating an example of a reference table of the leader follow-up control of the continuous robot, illustrated as a reference table according to the first exemplary embodiment of the present disclosure, stored in the control apparatus in FIG. 4.
Figure 8B:
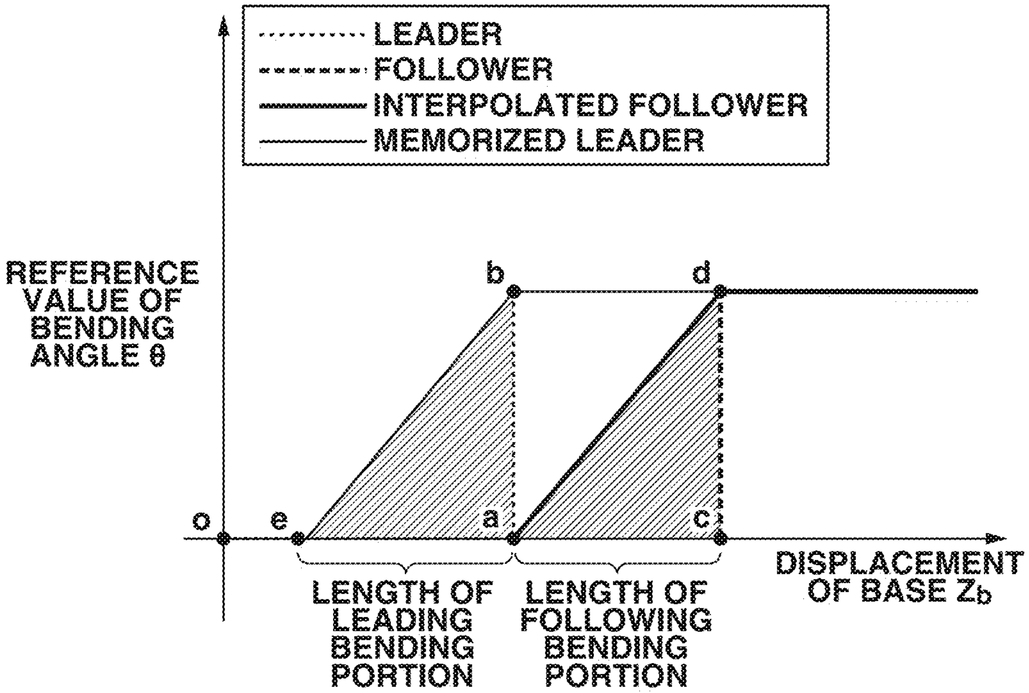
FIG. 8B is a diagram illustrating an example of a reference table of the tail follow-up control of the continuous robot, illustrated as a reference table according to the first exemplary embodiment of the present disclosure, stored in the control apparatus in FIG. 4.

FIGS. 8A and 8B are diagrams illustrating examples of reference tables of the leader follow-up control and the tail follow-up control of the continuous robot 100, illustrated as reference tables 2111 according to the first exemplary embodiment of the present disclosure, stored in the control apparatus 200 in FIG. 4.

Specifically, FIG. 8A illustrates a reference table 2111 of the leader follow-up control of the continuous robot 100. Specifically, the reference table 2111 in FIG. 8A is illustrated as a graph which takes the displacement $z_b$ of the base 140 on a horizontal axis and takes the bending angles θ of the most distal bending portion (leading bending portion) and the following bending portion on a vertical axis. In addition, in the reference table 2111 in FIG. 8A, an arrow pointing to the right, i.e., the horizontal axis for expressing the displacement $z_b$ of the base 140, indicates a direction of forward movement of the base 140 of the continuous robot 100. Further, for example, a position of the origin O (original position) in FIG. 8A corresponds to a position of the origin O (original position) illustrated in FIG. 5. Furthermore, as to a bending angle θ indicated on the vertical axis of FIG. 8A, a bending angle of the most distal bending portion (leading bending portion) 170-*e* in FIG. 7A is described as "Leader", and a bending angle of the following bending portion 170-(*e*−1) in FIG. 7A is described as "Follower". In this case, as to the displacement $z_b$ of the base 140 indicated by the horizontal axis of FIG. 8A, a distance between a position e and a position a corresponds to a length l of the most distal bending portion (leading bending portion), and a distance between the position a and a position c corresponds to a length l of the following bending portion 170-(*e*−1).

In FIG. 8A, a bending angle of the most distal bending portion (leading bending portion) 170-*e* input from the input apparatus 310 is expressed by a dashed line, and a bending angle of the following bending portion 170-(*e*−1) is expressed by a bold dashed line. FIG. 8A illustrates a state where a bending angle a→b is input from the input apparatus 310 as a target bending angle $\theta_L$ of the most distal bending portion (leading bending portion) 170-*e* at the position a of the displacement $z_b$ of the base 140. In this case, a bending angle of the following bending portion 170-(*e*−1) is automatically generated by the angle calculation unit 210, so as to become a bending angle c→d at a position c away from the position a of the displacement $z_b$ of the base 140 by a distance corresponding to the length l of the following bending portion 170-(*e*−1). Then, the bending angle of the following bending portion 170-(*e*−1) is stored in the storage unit 211 of the control apparatus 200 and is read depending on the displacement $z_b$ of the base 140. In a case where the number e of the bending portions 170 is 3 or greater, bending angles of all of the bending portions 170 can be acquired by continuously executing the above-described processing while replacing the above-described following bending portion with the most distal bending portion (leading bending portion).

However, according to the description of FIG. 8A, a bending angle of the following bending portion 170-(*e*−1) is not changed when the displacement $z_b$ of the base 140 is a position between the positions a and c, and the bending angle thereof rises to the bending angle c→d at the position c. As a result, the continuous robot 100 exhibits steep behavior. Therefore, according to the present exemplary embodiment, when the displacement $z_b$ of the base 140 is at a position between the positions a and c, a bending angle of the following bending portion 170-(*e*−1) is interpolated in such a way that the bending angle a and the bending angle d are connected to each other. Specifically, in the present exemplary embodiment, the angle calculation unit 210 of the control apparatus 200 firstly generates a right-angled triangle, i.e., a right-angled triangle indicated by shaded lines in FIG. 8A, which takes a length l of the following bending portion 170-(*e*−1) as a base conforming to a line segment ac, and a distance ab as a height. Next, at each of positions between the position a and the position c of the displacement z of the base 140, the angle calculation unit 210 of the control apparatus 200 acquires an intersection point where a straight line orthogonal to the coordinate axis of the displacement $z_b$ of the base 140 intersects with the oblique side of the generated right-angled triangle. Then, the angle calculation unit 210 of the control apparatus 200 generates an interpolated bending angle of the following bending portion 170-(*e*−1) by adding the length from the acquired intersection point to the base of the right-angled triangle to the bending angle of the following bending portion 170-(*e*−1) indicated by a bold dashed line. Herein, the interpolated bending angle of the following bending portion 170-(*e*−1) is indicated by a bold solid line in FIG. 8A.

3) Tail Follow-Up Control 3.1) Interpolation Method 1

Next, in this chapter, tail follow-up control will be described. As a first section, an interpolation method 1 of the tail follow-up control will be described.

According to the present exemplary embodiment, the tail follow-up control illustrated in FIG. 7B is a control method for making the base 140 return to the origin O by moving the continuous robot 100 backward while making the continuous robot 100 come close to a pathway indicated by a dotted line. Through the above-described method, when the continuous robot 100 sequentially moves backward as illustrated in states 721 to 725 in FIG. 7B, the continuous robot 100 can weave through the internal space of the tube 20 while moving backward. At this time, as a target bending angle of a bending portion 170 proximate to the base 140, the interpolated bending angle of the following bending portion 170-(*e*−1) indicated by a bold solid line in FIG. 8A may be read from the storage unit 211 depending on the displacement $z_b$ of the base 140.

As to the target bending angle of the most distal bending portion (leading bending portion) 170-*e*, first, a bending angle of the most distal bending portion (leading bending portion) 170-*e* input from the input apparatus 310 at the time of leader follow-up control is stored in the storage unit 211. At this time, in a similar way to the bending angle of the following bending portion 170-(*e*−1) proximate to the base 140, the bending angle may be interpolated and stored in the storage unit 211 through the method described in the second chapter. Further, according to the present exemplary embodiment, the bending angle a→b of the most distal bending portion (leading bending portion) 170-*e* is input from the input apparatus 310 at the position a of the displacement $z_b$ of the base 140, more distal to the position of the origin O than the length l of the most distal bending portion (leading bending portion) 170-*e*.

FIG. 8B illustrates a reference table 2111 of the tail follow-up control (which may also include the leader follow-up control) of the continuous robot 100. In FIG. 8B, the same reference numerals are applied to the elements similar to the elements according to the leader follow-up control of the continuous robot 100 illustrated in FIG. 8A, and detailed descriptions thereof are omitted. Specifically, in FIG. 8B, it is assumed that the base 140 advances to at least the position c through the leader follow-up control related to the forward movement of the continuous robot 100 described in FIGS. 7A and 8A. Then, in FIG. 8B, the tail follow-up control is executed on the continuous robot 100 in a state where the base 140 advances to at least the position c.

In FIG. 8B, in a case where the tail follow-up control of the most distal bending portion (leading bending portion) is to be executed, the angle calculation unit 210 of the control apparatus 200 firstly generates a right-angled triangle which takes the length l of the most distal bending portion (leading bending portion) 170-*e* as a base conforming to a line segment ac, and a distance ab as a height. Next, at each of positions between the position c and the position e of the displacement $z_b$ of the base 140, the angle calculation unit 210 of the control apparatus 200 acquires an intersection point where a straight line orthogonal to the coordinate axis of the displacement $z_b$ of the base 140 intersects with the oblique side of the generated right-angled triangle. Then, the angle calculation unit 210 of the control apparatus 200 generates an interpolated bending angle of the most distal bending portion (leading bending portion) 170-*e* by adding the length from the acquired intersection point to the base of the generated right-angled triangle to the bending angle of the most distal bending portion (leading bending portion) 170-*e* indicated by a dashed line. Herein, the interpolated bending angle of the most distal bending portion 170-*e* is indicated by a solid line in FIG. 8B.

Specifically, in the interpolation method 1 of the leader follow-up control and the tail follow-up control of the continuous robot 100 illustrated in FIGS. 8A and 8B, the control apparatus 200 executes the following control.

In the leader follow-up control related to the forward movement of the continuous robot 100, the control apparatus 200 firstly executes control to bring the continuous robot 100 into a first state where the most distal bending portion (leading bending portion) 170-*e* bends at a bending angle e (first bending angle) with respect to the reference axis 101 while the base 140 is being located at a position e (first position). Next, the control apparatus 200 executes control to bring the continuous robot 100 into a second state where the most distal bending portion (leading bending portion) 170-*e* bends at a bending angle b (second bending angle) different from the bending angle e with respect to the reference axis 101 while the base is being located at a position a (second position) by moving forward from the position e (first position). Subsequently, the control apparatus 200 executes control to bring the continuous robot 100 into a third state where the base 140 is located at a position c (third position) by moving forward from the position a (second position). In other words, in the leader follow-up control related to the forward movement of the continuous robot 100, the control apparatus 200 brings the continuous robot 100 into a state where at least the most distal bending portion (leading bending portion) 170-*e* is inserted into the internal portion of the tube 20 by shifting a state in the order of the first state, the second state, and the third state described above.

Thereafter, when the control apparatus 200 extracts the most distal bending portion (leading bending portion) 170-*e* from the tube 20 by moving the continuous robot 100 backward, the control apparatus 200 executes the tail follow-up control related to the backward movement of the continuous robot 100. In the tail follow-up control, the control apparatus 200 executes control to bring the continuous robot 100 into a fourth state where the most distal bending portion (leading bending portion) 170-*e* bends at a third bending angle between the bending angle b (second bending angle) and the bending angle e (first bending angle) with respect to the reference axis 101 while the base 140 is being located at a position between the position c (third position) and the position e (first position). More specifically, in the example illustrated in FIG. 8B, the control apparatus 200 executes control to bring the continuous robot 100 into the fourth state where the most distal bending portion (leading bending portion) 170-*e* bends at the third bending angle between the bending angle b (second bending angle) and the bending angle e (first bending angle) with respect to the reference axis 101 while the base 140 is being located at a position between the position a (second position) and the position e (first position).

3.2) Interpolation Method 2

The method using a right-angled triangle, described in the second chapter, is effective for the leader follow-up control because a bending angle of the following bending portion 170-(*e*−1) has to be generated in the actual time. However, with regard to the most distal bending portion (leading bending portion) 170-*e*, a target bending angle thereof can be interpolated at least when the information about backward movement of the base 140 is input from the input apparatus 330. Therefore, in the second section, a plurality of examples will be described as an interpolation method 2 of the tail follow-up control.

FIGS. 9A and 9B and FIGS. 10A and 10B are diagrams illustrating examples of reference tables of the tail follow-up control (which may also include the leader follow-up control) of the continuous robot 100, illustrated as reference tables 2111 according to the first exemplary embodiment of the present disclosure, stored in the control apparatus 200 in FIG. 4. Specifically, FIGS. 9A and 9B and FIGS. 10A and 10B illustrate a plurality of examples as the interpolation method 2 of the tail follow-up control, and the same reference numerals are applied to the elements similar to the elements illustrated in FIGS. 8A and 8B, and detailed descriptions thereof are omitted.

Figure 9A:
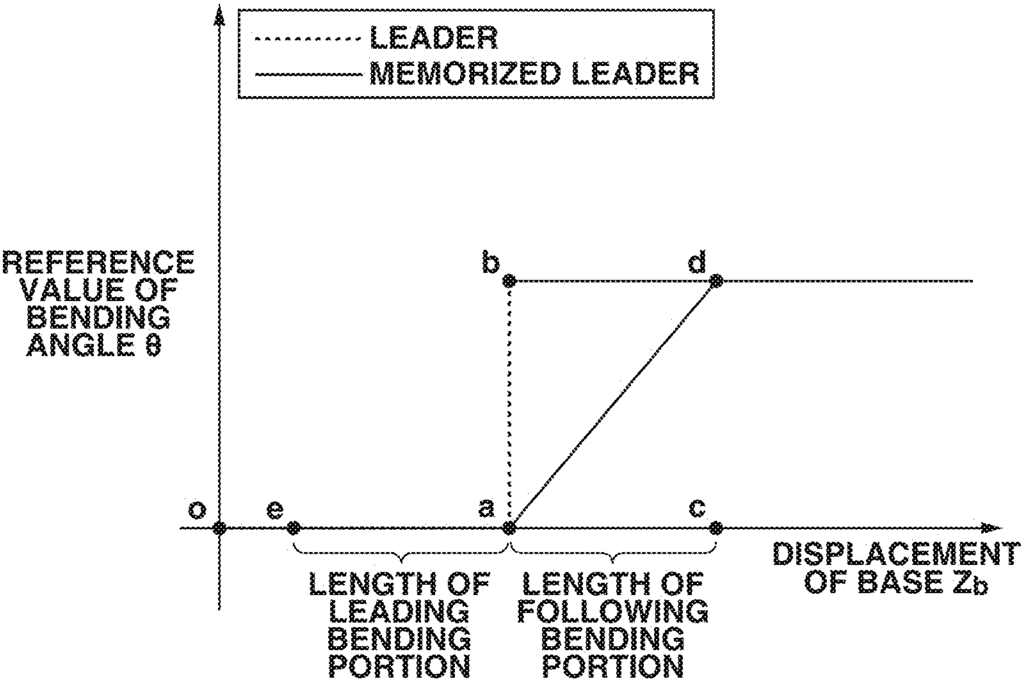
FIG. 9A is a diagram illustrating an example of a reference table of the tail follow-up control (which may also include the leader follow-up control) of the continuous robot, illustrated as a reference table according to the first exemplary embodiment of the present disclosure, stored in the control apparatus in FIG. 4.

In the example illustrated in FIG. 9A, after the most distal bending portion (leading bending portion) 170-*e* bends at the bending angle b while the base 140 is located at the position a by moving forward from the position e, the interpolation method 2 of the tail follow-up control is executed when the base 140 is located at the position c by moving forward from the position a by the length l of the following bending portion. In FIG. 9A, a bending angle of the most distal bending portion (leading bending portion) 170-*e* input from the input apparatus 310 is expressed by a dashed line, and an interpolated bending angle of the most distal bending portion (leading bending portion) 170-*e* is expressed by a solid line. In the example illustrated in FIG. 9A, when the base 140 is located at the position a, a bending angle of the most distal bending portion (leading bending portion) 170-*e* is interpolated, so as to return with the length l of the following bending portion 170-(*e*−1). This bending angle corresponds to a bending angle of a line segment which connects the bending angle d and the bending angle a of the most distal bending portion (leading bending portion) 170-*e*, and conforms to the interpolated bending angle of the following bending portion 170-(*e*−1) expressed by a bold solid line in FIGS. 8A and 8B. Further, the displacement $z_b$ of the base 140, at which the bending angle of the most distal bending portion (leading bending portion) 170-*e* returns, is not limited to the position a, and can be any displacement $z_b$ of the base 140 proximate to the position of the origin O than the position c.

Specifically, through the interpolation method 2 of the tail follow-up control illustrated in FIG. 9A, the control apparatus 200 executes control to bring the continuous robot 100 into the fourth state where the most distal bending portion (leading bending portion) 170-*e* bends at the third bending angle between the bending angle d (second bending angle) and the bending angle e (first bending angle) with respect to the reference axis 101 while the base 140 is being located at a position between the position c (third position) and the position a (second position).

Figure 9B:
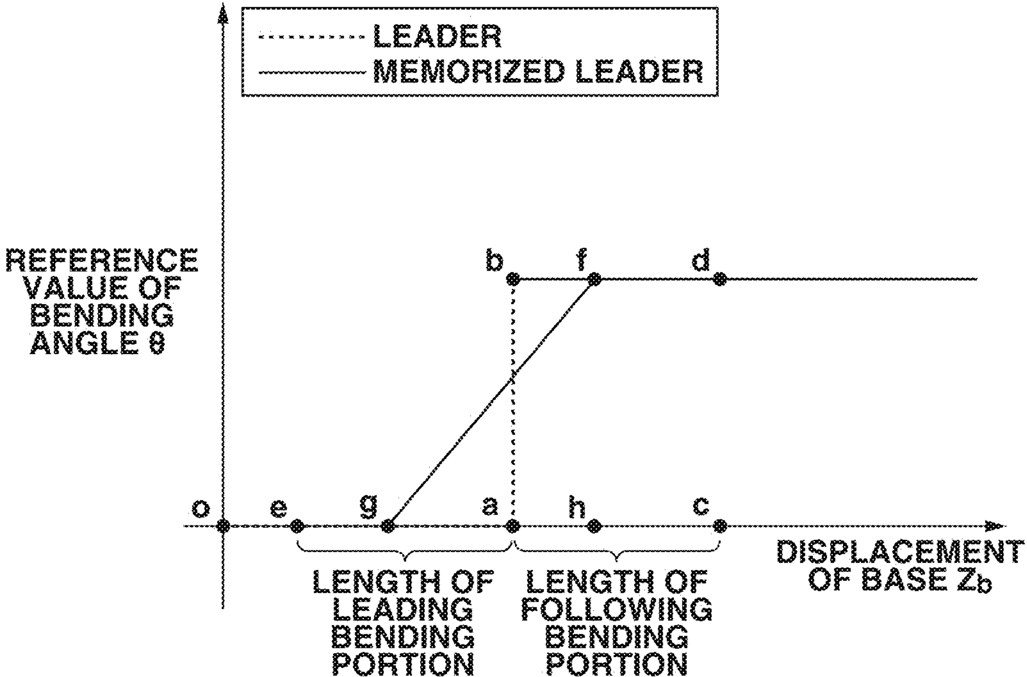
FIG. 9B is a diagram illustrating an example of a reference table of the tail follow-up control (which may also include the leader follow-up control) of the continuous robot, illustrated as a reference table according to the first exemplary embodiment of the present disclosure, stored in the control apparatus in FIG. 4.

In the example illustrated in FIG. 9B, after the most distal bending portion (leading bending portion) 170-*e* bends at the bending angle b while the base 140 is located at the position a by moving forward from the position e, the interpolation method 2 of the tail follow-up control is executed at a position h, halfway through while the base 140 moves forward from the position a by the length l of the following bending portion. In the example illustrated in FIG. 9B, when the base 140 is located at a position g between the position a and the position e, a bending angle of the most distal bending portion (leading bending portion) 170-*e* is interpolated, so as to return with the length l of the following bending portion 170-(*e*−1). However, the displacement $z_b$ of the base 140, at which the bending angle of the most distal bending portion (leading bending portion) 170-*e* returns, is not limited to the position g, and can be any displacement $z_b$ of the base 140 proximate to the position of the origin O than the position h.

Figure 10A:
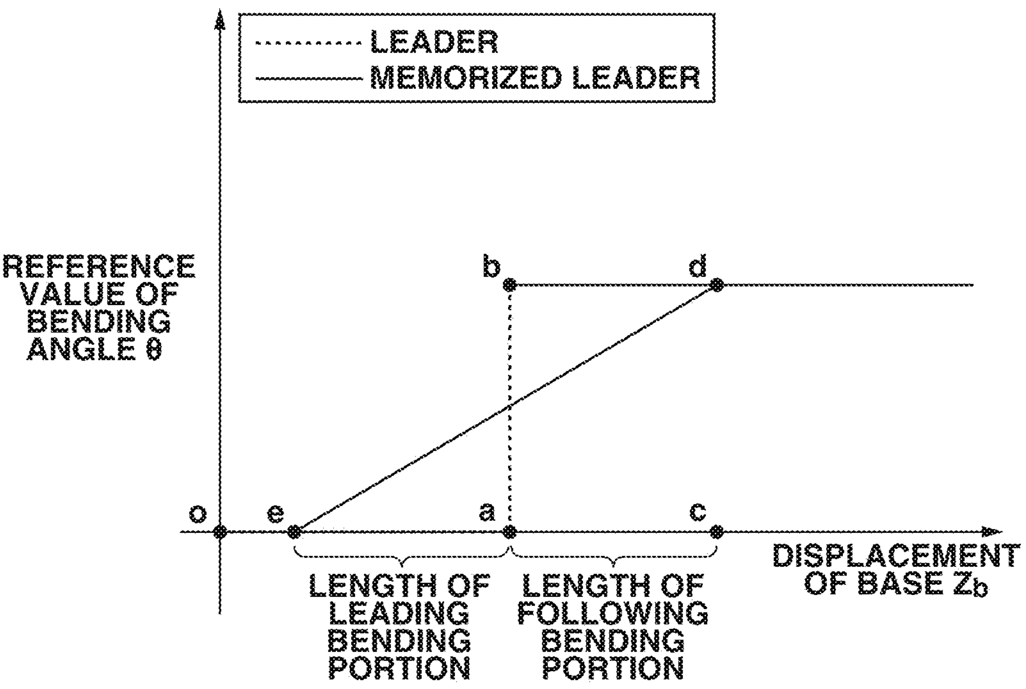
FIG. 10A is a diagram illustrating an example of a reference table of the tail follow-up control (which may also include the leader follow-up control) of the continuous robot, illustrated as a reference table according to the first exemplary embodiment of the present disclosure, stored in the control apparatus in FIG. 4.

FIG. 10A is a modification example of FIG. 9A, and a bending angle of the most distal bending portion (leading bending portion) 170-*e* is interpolated, so as to return linearly with a sum of the length l of the following bending portion 170-(*e*−1) and the length l of the most distal bending portion (leading bending portion) 170-*e*.

Figure 10B:
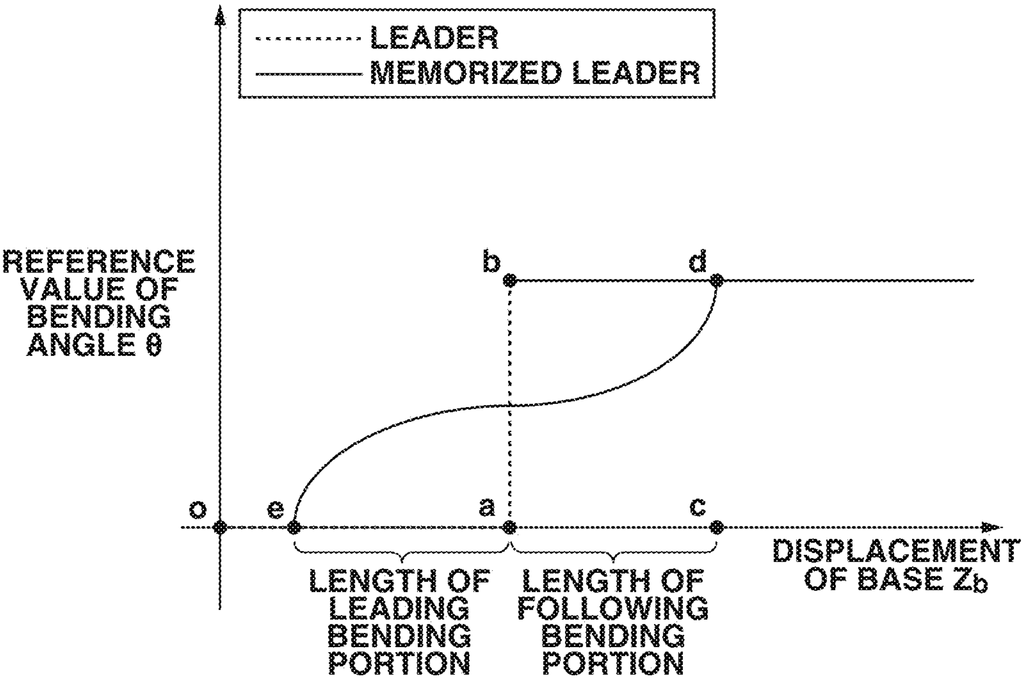
FIG. 10B is a diagram illustrating an example of a reference table of the tail follow-up control (which may also include the leader follow-up control) of the continuous robot, illustrated as a reference table according to the first exemplary embodiment of the present disclosure, stored in the control apparatus in FIG. 4.

FIG. 10B is a modification example of FIG. 9B, and a bending angle of the most distal bending portion (leading bending portion) 170-*e* is interpolated, so as to return curvilinearly instead of returning linearly. In the example illustrated in FIG. 10B, a bending angle of the most distal bending portion (leading bending portion) 170-*e* is interpolated in an elliptic arc-like state. However, the present exemplary embodiment is not limited thereto.

In each of the examples illustrated in FIGS. 10A and 10B, the control apparatus 200 executes control to bring the continuous robot 100 into a fourth state where the most distal bending portion (leading bending portion) 170-*e* bends at the third bending angle between the bending angle d (second bending angle) and the bending angle e (first bending angle) with respect to the reference axis 101 while the base 140 is being located at a position between the position c (third position) and the position e (first position).

In addition, according to the interpolation method 2 of the tail follow-up control described in this section, the displacement $z_b$ of the base 140, at which the most distal bending portion (leading bending portion) 170-*e* starts returning, is described as a position proximate to the position of the origin O from the position c. However, the displacement $z_b$ may be described as a position distal from the position c.

4) Simulation

In this chapter, a result of simulation using the tail follow-up control described in the chapter 3 will be described. In the simulation described below, the number e of the bending portions 170 is 2, and two bending portions 170 are the most distal bending portion (leading bending portion) 170-*e* and the following bending portion 170-(*e*−1) illustrated in FIGS. 7A and 7B. Further, in the below-described simulation, a length of the most distal bending portion (leading bending portion) 170-*e* is 0.02 m, and a length of the following bending portion 170-(*e*−1) is 0.02 m.

First, a response of the leader follow-up control will be described.

In the simulation related to a response of the leader follow-up control, the most distal bending portion (leading bending portion) 170-*e* moves forward in a straight line by 0.02 m after the operation is started, bends at 50 degrees with respect to the reference axis 101 in that place, and further moves forward by 0.02 m.

Figure 11:
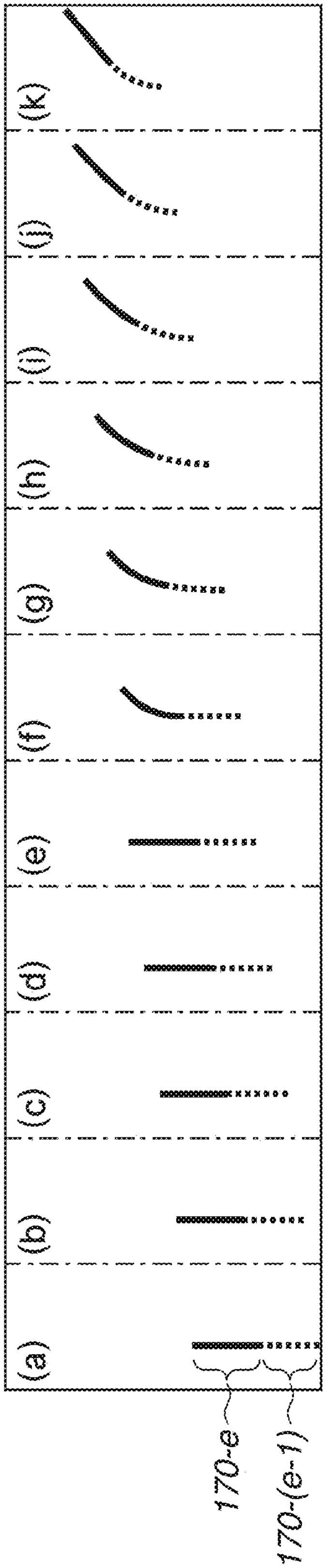
FIG. 11 is a diagram illustrating a result of simulation related to a response of the leader follow-up control of the continuous robot according to the first exemplary embodiment of the present disclosure.

FIG. 11 illustrates a result of simulation related to a response of the leader follow-up control of the continuous robot 100 according to the first exemplary embodiment of the present disclosure. Specifically, in each of FIGS. 11A to 11K, a bending shape of the most distal bending portion (leading bending portion) 170-*e* is expressed by a solid line, and a bending shape of the following bending portion 170-(*e*−1) is expressed by a dashed line.

Next, a response of the tail follow-up control will be described.

Figure 12:
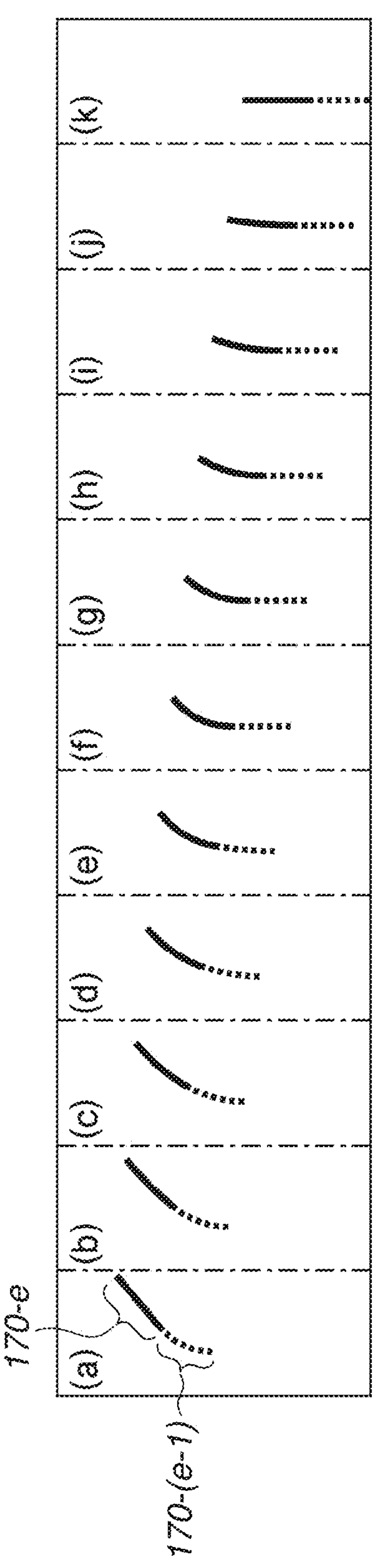
FIG. 12 is a diagram illustrating a result of simulation related to a response of an interpolation method 1 of the tail follow-up control in FIG. 8B of the continuous robot according to the first exemplary embodiment of the present disclosure.

FIG. 12 illustrates a result of simulation related to a response of the interpolation method 1 of the tail follow-up control in FIG. 8B of the continuous robot 100 according to the first exemplary embodiment of the present disclosure. Specifically, in each of FIGS. 12A to 12K, a bending shape of the most distal bending portion (leading bending portion) 170-*e* is expressed by a solid line, and a bending shape of the following bending portion 170-(*e*−1) is expressed by a dashed line. As illustrated in FIG. 12, after the bending angle of the following bending portion 170-(*e*−1) returns to 0 from 50 degrees, the bending angle of the most distal bending portion (leading bending portion) 170-*e* returns to 0 from 50 degrees. A space occupied by the most distal bending portion (leading bending portion) 170-*e* at the time of backward movement illustrated in each of FIGS. 12G to 12K does not conform to a space occupied at the time of forward movement illustrated in each of FIGS. 11A to 11E. However, the occupied space at the time of backward movement illustrated in each of FIGS. 12A to 12F conforms to the occupied space at the time of forward movement illustrated in each of FIGS. 11F to 11K. As a result, it is found that the method is effective when the continuous robot 100 moves backward while avoiding contact with distal obstacles.

Figure 13:
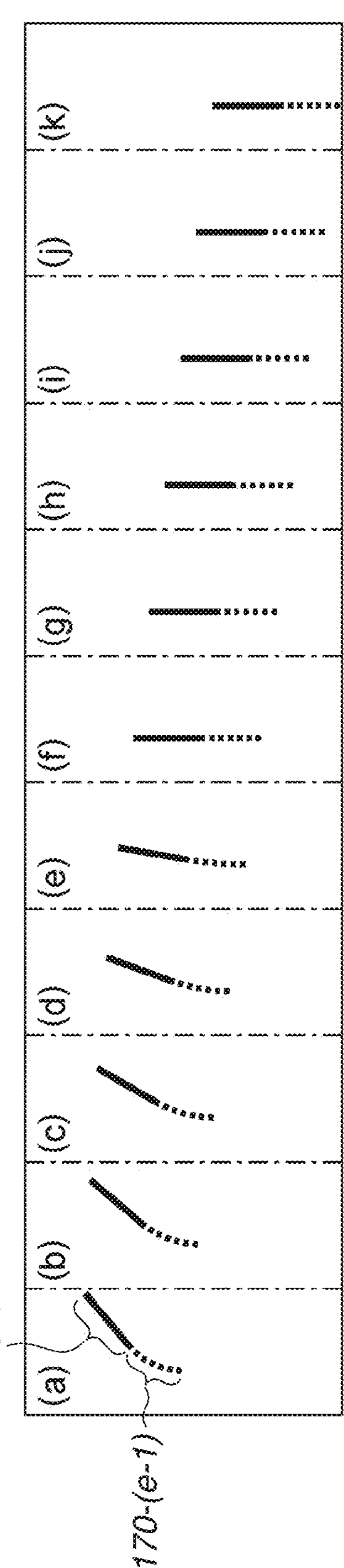
FIG. 13 is a diagram illustrating a result of simulation related to a response of an interpolation method 2 of the tail follow-up control in FIG. 9A of the continuous robot according to the first exemplary embodiment of the present disclosure.

FIG. 13 illustrates a result of simulation related to a response of the interpolation method 2 of the tail follow-up control in FIG. 9A of the continuous robot 100 according to the first exemplary embodiment of the present disclosure. Specifically, in each of FIGS. 13A to 13K, a bending shape of the most distal bending portion (leading bending portion) 170-*e* is expressed by a solid line, and a bending shape of the following bending portion 170-(*e*−1) is expressed by a dashed line. As illustrated in FIG. 13, the bending angle of the most distal bending portion (leading bending portion) 170-*e* returns to 0 from 50 degrees at the same time the bending angle of the following bending portion 170-(*e*−1) returns to 0 from 50 degrees. A space occupied by the most distal bending portion (leading bending portion) 170-*e* at the time of backward movement illustrated in each of FIGS. 13A to 13F does not conform to a space occupied at the time of forward movement illustrated in each of FIGS. 11F to 11K. However, the occupied space at the time of backward movement illustrated in each of FIGS. 13F to 13K conforms to the occupied space at the time of forward movement illustrated in each of FIGS. 11A to 11E. As a result, it is found that the method is effective when the continuous robot 100 moves backward while avoiding contact with proximal obstacles.

Figure 14:
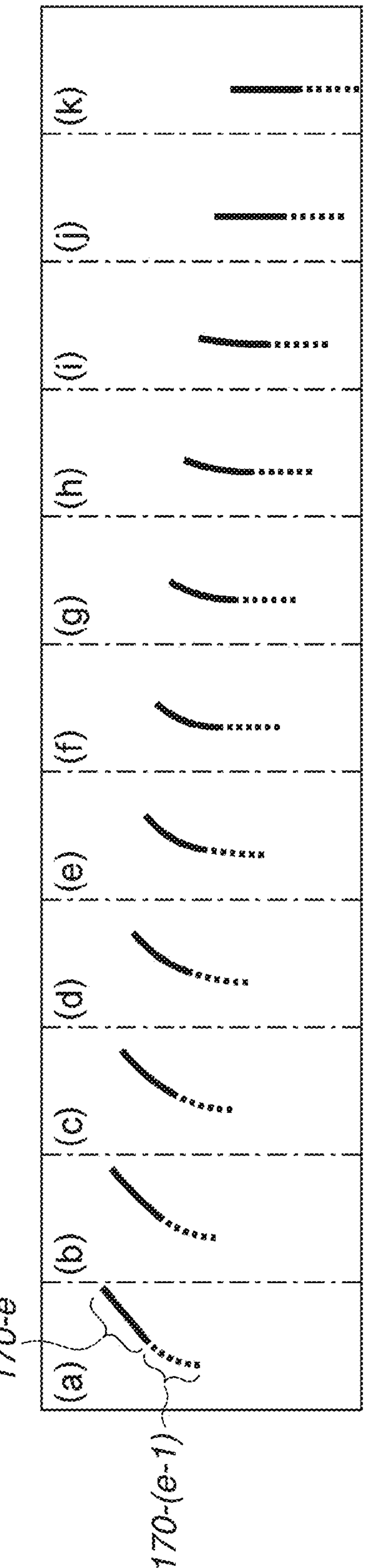
FIG. 14 is a diagram illustrating a result of simulation related to a response of the interpolation method 2 of the tail follow-up control in FIG. 9B of the continuous robot according to the first exemplary embodiment of the present disclosure.

FIG. 14 illustrates a result of simulation related to a response of the interpolation method 2 of the tail follow-up control in FIG. 9B of the continuous robot 100 according to the first exemplary embodiment of the present disclosure. Specifically, in each of FIGS. 14A to 14K, a bending shape of the most distal bending portion (leading bending portion) 170-*e* is expressed by a solid line, and a bending shape of the following bending portion 170-(*e*−1) is expressed by a dashed line. As illustrated in FIG. 14, the bending angle of the most distal bending portion (leading bending portion) 170-*e* starts returning to 0 from 50 degrees in FIG. 14E, before the bending angle of the following bending portion 170-(*e*−1) completely returns to 0 from 50 degrees, and the bending angle of the most distal bending portion (leading bending portion) 170-*e* completely returns to 0 in FIG. 14J. A space occupied by the most distal bending portion (leading bending portion) 170-*e* at the time of backward movement illustrated in each of FIGS. 14E to 14J does not conform to a space occupied at the time of forward movement illustrated in each of FIGS. 11B to 11G. However, the occupied space at the time of backward movement illustrated in each of FIGS. 14A to 14D, and FIGS. 14J and 14K conforms to the occupied space at the time of forward movement illustrated in each of FIGS. 11A, 11B, and FIGS. 11H to 11E. As a result, it is found that the method is effective when the continuous robot 100 moves backward while avoiding contact with the most distal and the most proximal obstacles.

Figure 15:
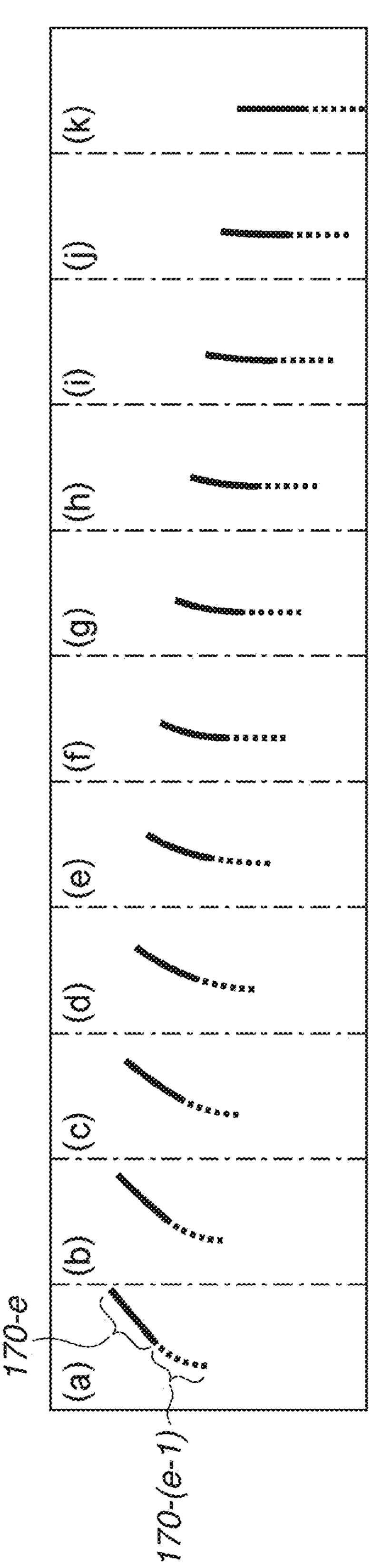
FIG. 15 is a diagram illustrating a result of simulation related to a response of the interpolation method 2 of the tail follow-up control in FIG. 10A of the continuous robot according to the first exemplary embodiment of the present disclosure.

FIG. 15 illustrates a result of simulation related to a response of the interpolation method 2 of the tail follow-up control in FIG. 10A of the continuous robot 100 according to the first exemplary embodiment of the present disclosure.

Specifically, in each of FIGS. 15A to 15K, a bending shape of the most distal bending portion (leading bending portion) 170-*e* is expressed by a solid line, and a bending shape of the following bending portion 170-(*e*−1) is expressed by a dashed line.

In FIG. 15, return of the bending angle of the most distal bending portion (leading bending portion) 170-*e* is started and ended in conjunction with start and end of backward movement. A space occupied by the most distal bending portion (leading bending portion) 170-*e* at the time of backward movement does not conform to a space occupied at the time of forward movement across the entire region. However, a difference between the space occupied at the time of backward movement and the space occupied at the time of forward movement becomes average across the entire region. As a result, it is found that the method is effective when the continuous robot 100 moves backward while averagely avoiding contact with obstacles.

In the above-described first exemplary embodiment, when the control apparatus 200 extracts the most distal bending portion (leading bending portion) 170-*e* from the tube 20 by moving the continuous robot 100 backward after inserting the most distal bending portion (leading bending portion) 170-*e* into the inner portion of the tube 20 by moving the continuous robot 100 forward, the control apparatus 200 executes control to bring the continuous robot 100 into a state where the most distal bending portion (leading bending portion) 170-*e* bends at a third bending angle between the bending angle d (second bending angle) and the bending angle e (first bending angle) with respect to the reference axis 101 while the base 140 is being located at a position between the position c (third position) and the position e (first position).

According to the above-described configuration, a posture of the continuous robot 100 is appropriately controlled when the continuous robot 100 moves backward after moving forward, so that the continuous robot 100 can be prevented from being damaged.

Second Exemplary Embodiment

Next, a second exemplary embodiment of the present disclosure will be described. In the below-described second exemplary embodiment, descriptions are omitted with respect to items common to the above-described first exemplary embodiment, and items different from the first exemplary embodiment will be described.

A schematic configuration of the continuous robot control system according to the second exemplary embodiment is similar to the schematic configuration of the continuous robot control system 10-1 according to the first exemplary embodiment illustrated in FIG. 4. Further, a schematic configuration of the continuous robot 100 according to the second exemplary embodiment is similar to the schematic configuration of the continuous robot 100 according to the first exemplary embodiment illustrated in FIGS. 1, 2, and 5.

According to the above-described first exemplary embodiment, as illustrated in each of FIGS. 8A and 8B to FIGS. 10A and 10B, a distance between the position a (second position) of the displacement $z_b$ of the base 140 and a position of the origin O (original position) of the base 140 is greater than the length l of the most distal bending portion (leading bending portion) 170-*e*. On the other hand, in the second exemplary embodiment, it is assumed that a distance between the position a (second position) of the displacement $z_b$ of the base 140 and a position of the origin O (original position) of the base 140 is less than the length l of the most distal bending portion (leading bending portion) 170-*e*.

Figure 16:
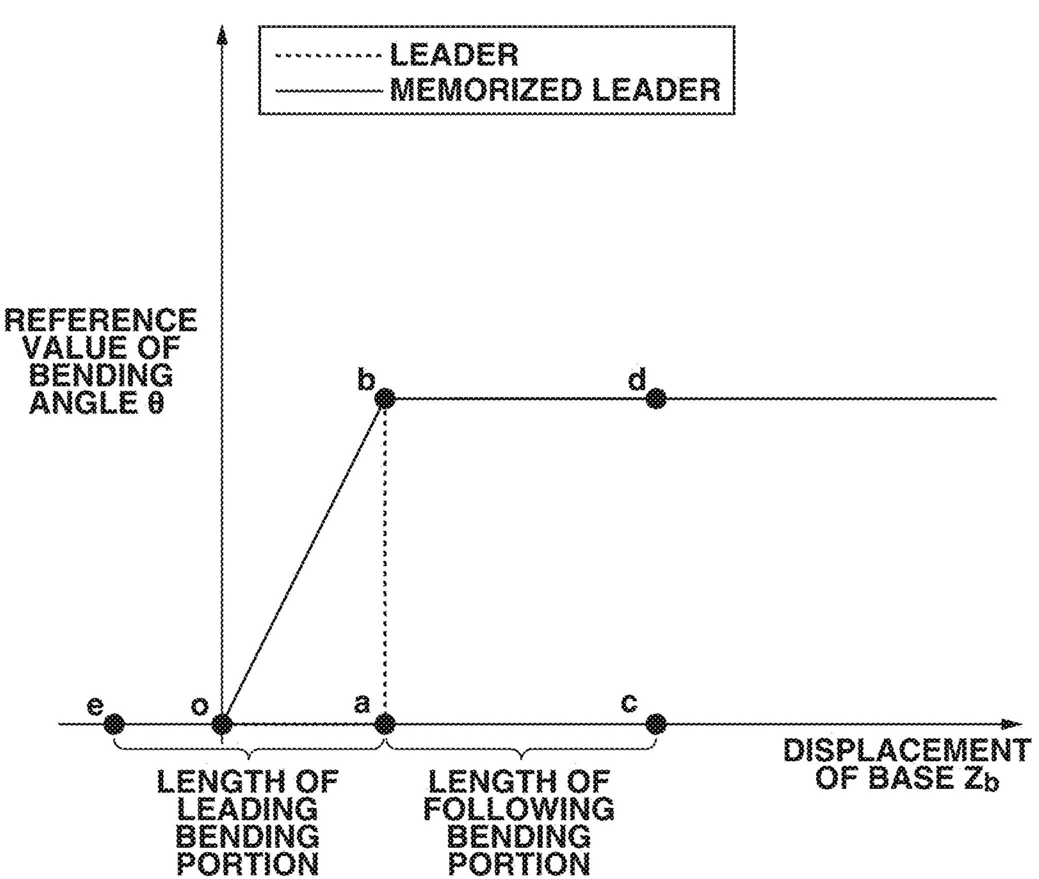
FIG. 16 is a diagram illustrating an example of a reference table of the tail follow-up control (which may also include the leader follow-up control) of the continuous robot, illustrated as a reference table according to a second exemplary embodiment of the present disclosure, stored in the control apparatus in FIG. 4.

FIG. 16 illustrates an example of a reference table of the tail follow-up control (which may also include the leader follow-up control) of the continuous robot 100, illustrated as a reference table 2111 according to the second exemplary embodiment of the present disclosure, stored in the control apparatus 200 in FIG. 4. In FIG. 16, the same reference numerals are applied to the elements similar to those illustrated in FIGS. 8A and 8B to FIGS. 10A and 10B, and detailed descriptions thereof are omitted.

As illustrated in FIG. 16, a distance between a position of the origin O (original position) and the position a (second position) of the displacement $z_b$ of the base 140 is less than the length l of the most distal bending portion (leading bending portion) 170-*e*. In the example illustrated in FIG. 16, a bending angle of the most distal bending portion (leading bending portion) 170-*e* is interpolated after a change of the bending angle of the most distal bending portion (leading bending portion) 170-*e* is input from the input apparatus 310 at the position a of the displacement $z_b$ of the base 140. In FIG. 16, a bending angle of the most distal bending portion (leading bending portion) 170-*e* input from the input apparatus 310 is expressed by a dashed line, and an interpolated bending angle of the most distal bending portion (leading bending portion) 170-*e* is expressed by a solid line.

Because a distance between the position of the origin O and the position a of the displacement $z_b$ of the base 140 is less than the length l of the most distal bending portion (leading bending portion) 170-*e*, the bending angle of the most distal bending portion (leading bending portion) 170-*e* does not converge to zero at the position of the origin O if the interpolation method 1 of the tail follow-up control described in the first exemplary embodiment is employed. Therefore, in the second exemplary embodiment, it is preferable that the interpolation method 2 of the first exemplary embodiment be employed. In this regard, it is preferable that the displacement $z_b$ of the base 140, where the bending angle of the most distal bending portion (leading bending portion) 170-*e* returns, be a position between the position of the origin O and the position a.

Specifically, in the example illustrated in FIG. 16, when the control apparatus 200 executes tail follow-up control of the continuous robot 100, the control apparatus 200 executes control for making the bending angle of the most distal bending portion (leading bending portion) 170-*e* be zero when the base 140 is located at a position of the origin O (original position).

Similar to the first exemplary embodiment described above, according to the second exemplary embodiment, a posture of the continuous robot 100 is appropriately controlled when the continuous robot 100 moves backward after moving forward, so that the continuous robot 100 can be prevented from being damaged.

Third Exemplary Embodiment

Next, a third exemplary embodiment of the present disclosure will be described. In the third exemplary embodiment described below, descriptions are omitted with respect to items common to the first and the second exemplary embodiments described above, and items different from the first and the second exemplary embodiments will be described.

A schematic configuration of the continuous robot control system according to the third exemplary embodiment is similar to the schematic configuration of the continuous robot control system 10-1 according to the first exemplary embodiment illustrated in FIG. 4. Further, a schematic configuration of the continuous robot 100 according to the third exemplary embodiment is similar to the schematic configuration of the continuous robot 100 according to the first exemplary embodiment illustrated in FIGS. 1, 2, and 5.

In the first and the second exemplary embodiments described above, a bending angle of the most distal bending portion (leading bending portion) 170-*e* is returned based on the displacement $z_b$ of the base 140. However, for example, in a case where a position h and a position g of the displacement $z_b$ of the base 140 illustrated in FIG. 9B of the above-described first exemplary embodiment are close to each other, return operation of the bending angle of the most distal bending portion (leading bending portion) 170-*e* is executed steeply. The same also occurs in the above-described second exemplary embodiment in a case where the position a is close to the position of the origin O (original position).

Therefore, in the third exemplary embodiment, a control method for making the bending angle of the most distal bending portion (leading bending portion) 170-*e* return without depending on the displacement $z_b$ of the base 140 is described.

Figure 17:
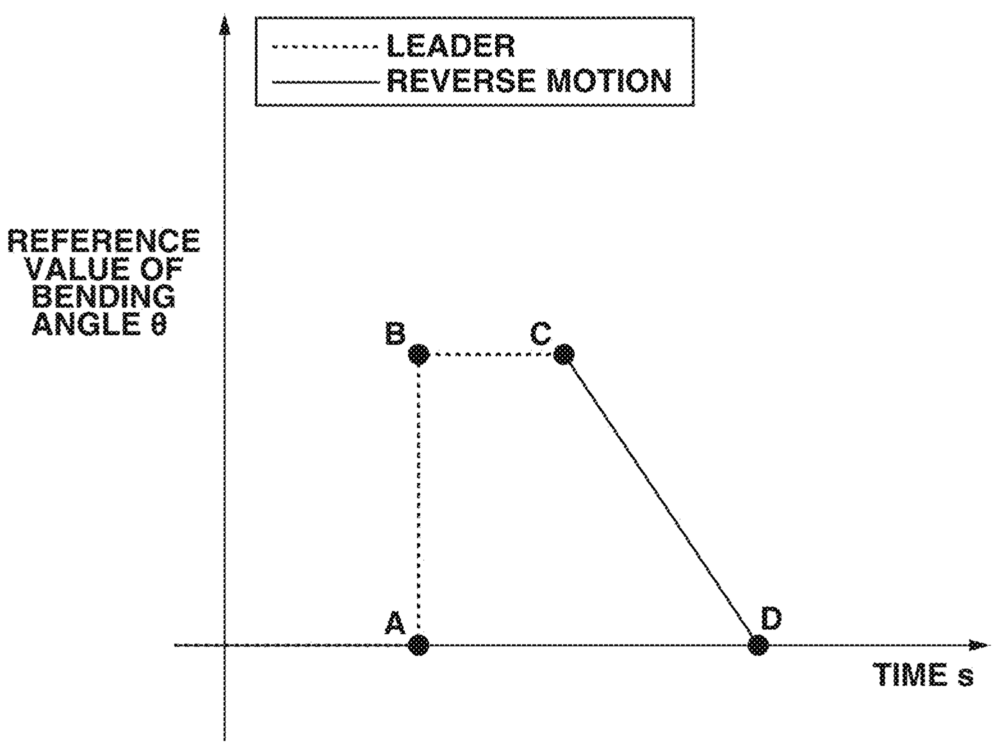
FIG. 17 is a diagram illustrating an example of a reference table of the tail follow-up control (which may also include the leader follow-up control) of the continuous robot, illustrated as a reference table according to a third exemplary embodiment of the present disclosure, stored in the control apparatus in FIG. 4.

FIG. 17 is a diagram illustrating an example of a reference table of the tail follow-up control (which may also include the leader follow-up control) of the continuous robot 100, illustrated as a reference table 2111 according to the third exemplary embodiment of the present disclosure, stored in the control apparatus 200 in FIG. 4. In FIG. 17, the same reference numerals are applied to the elements similar to those illustrated in FIGS. 8A and 8B to FIGS. 10A and 10B, and detailed descriptions thereof are omitted.

Specifically, the reference table 2111 in FIG. 17 is illustrated as a graph which takes a time as a horizontal axis and takes a bending angle θ of the most distal bending portion (leading bending portion) as a vertical axis. In FIG. 17, a bending angle of the most distal bending portion (leading bending portion) 170-*e* received from the input apparatus 310 is expressed by a dashed line, and an interpolated bending angle of the most distal bending portion (leading bending portion) 170-*e* is expressed by a solid line.

In FIG. 17, first, a change of a bending angle of the most distal bending portion (leading bending portion) 170-*e* is input from the input apparatus 310 at a time A, so that a bending angle of the most distal bending portion (leading bending portion) 170-*e* is changed to B from A. Thereafter, in a case where an instruction for making the continuous robot 100 move backward is issued in a short time in a state (third state) where the continuous robot 100 moves forward with a small displacement of the base 140, or in a state (second state) where the continuous robot 100 does not move forward, the control apparatus 200 places a speed limitation on a change rate of the bending angle of the most distal bending portion (leading bending portion) 170-*e* and makes the bending angle return to a bending angle D from a bending angle C. In other words, according to the present exemplary embodiment, in a case where the control apparatus 200 is instructed to shift a state to the fourth state related to the backward movement from the third state or the second state within a time shorter than a prescribed time, the control apparatus 200 controls a change rate of the bending angle of the most distal bending portion (leading bending portion) 170-*e* with respect to time.

Similar to the first exemplary embodiment described above, according to the third exemplary embodiment, a posture of the continuous robot 100 is appropriately controlled when the continuous robot 100 moves backward after moving forward, so that the continuous robot 100 can be prevented from being damaged.

Fourth Exemplary Embodiment

Next, a fourth exemplary embodiment of the present disclosure will be described. In the fourth exemplary embodiment described below, descriptions are omitted with respect to items common to the first to the third exemplary embodiments described above, and items different from the first to the third exemplary embodiments will be described.

A schematic configuration of the continuous robot 100 according to the fourth exemplary embodiment is similar to the schematic configuration of the continuous robot 100 according to the first exemplary embodiment illustrated in FIGS. 1, 2, and 5.

Figure 18:
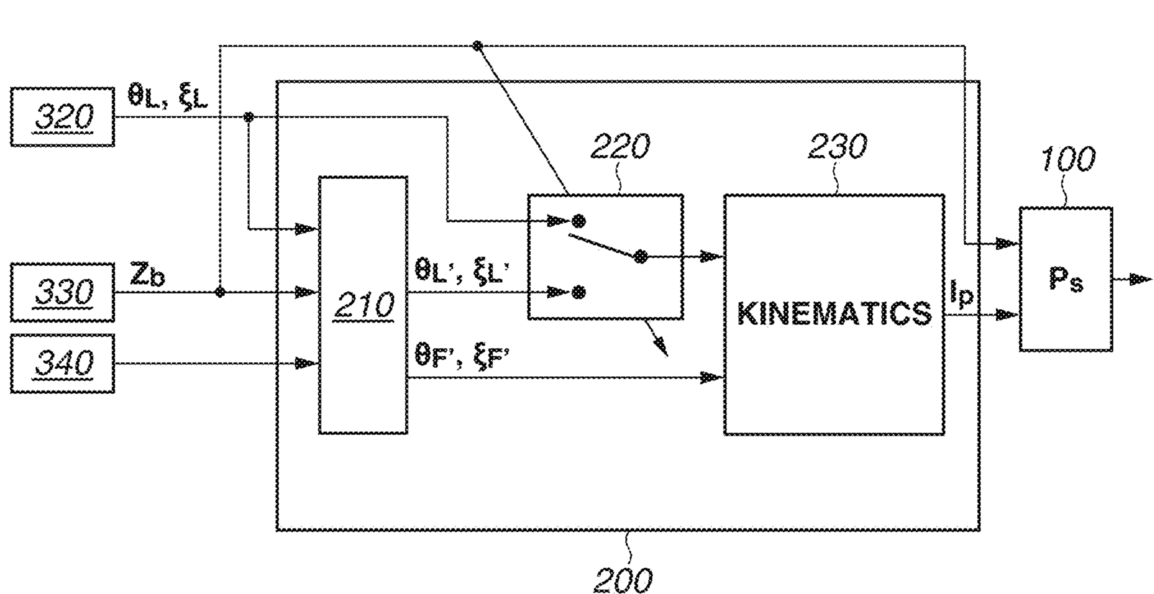
FIG. 18 is a diagram illustrating an example of a schematic configuration of the continuous robot control system according to a fourth exemplary embodiment of the present disclosure.

FIG. 18 is a diagram illustrating an example of a schematic configuration of the continuous robot control system 10-4 according to the fourth exemplary embodiment of the present disclosure. In FIG. 18, the same reference numerals are applied to the constituent elements similar to those illustrated in FIG. 4, and detailed descriptions thereof are omitted. The continuous robot control system 10-4 in FIG. 18 is a system which executes control of the continuous robot 100 illustrated in FIGS. 1 and 2. As illustrated in FIG. 18, the continuous robot control system 10-4 includes the continuous robot 100, the control apparatus 200, and various input apparatuses 320, 330, and 340.

The input apparatus 320 inputs a target turning angle $\zeta_L$ of the most distal bending portion (leading bending portion) to the control apparatus 200, in addition to a target bending angle $\theta_L$ of the most distal bending portion (leading bending portion) input by the input apparatus 310 in FIG. 1.

As illustrated in FIG. 18, the control apparatus 200 includes an angle calculation unit 210, a switching unit 220, and a kinematics calculation unit (Kinematics) 230.

A target bending angle $\theta_L$ and a target turning angle $\zeta_L$ of the most distal bending portion (leading bending portion) are input to the angle calculation unit 210 from the input apparatus 320, a displacement $z_b$ of the base 140 is input to the angle calculation unit 210 from the input apparatus 330, and information about lengths l of the plurality of bending portions 170 is input to the angle calculation unit 210 from the input apparatus 340. Then, based on the input information, the angle calculation unit 210 calculates a target bending angle $\theta_F$ and a target turning angle $\zeta_F$ of the following bending portion, and calculates a target bending angle $\theta_F'$ and a target turning angle $\zeta_F'$ of the following bending portion, which are changed depending on change of the target bending angle $\theta_L$ of the most distal bending portion (leading bending portion). Further, the angle calculation unit 210 stores the target bending angle $\theta_L$ and the target turning angle $\zeta_L$ of the most distal bending portion (leading bending portion) and the target bending angle $\theta_F$ and the target turning angle $\zeta_F$ of the following bending portion, and calculates a target bending angle $\theta_L'$ and a target turning angle $\zeta_L'$ of the most distal bending portion when the base 140 of the continuous robot 100 moves backward.

Depending on a traveling direction of the displacement $z_b$ of the base 140, the switching unit 220 switches a target bending angle and a target turning angle of the most distal bending portion (leading bending portion) between the target bending angle $\theta_L$ and the target turning angle $\zeta_L$ input from the input apparatus 320 and the target bending angle $\theta_L'$ and the target turning angle $\zeta_L'$ calculated by the angle calculation unit 210. Specifically, in the present exemplary embodiment, the switching unit 220 selects the target bending angle $\theta_L$ and the target turning angle $\zeta_L$ input from the input apparatus 320 to switch the target bending angle and the target turning angle in a case where the traveling direction of the displacement $z_b$ of the base 140 is a direction of forward movement. Further, the switching unit 220 selects the target bending angle $\theta_L'$ and the target turning angle $\zeta_L'$ calculated by the angle calculation unit 210 to switch the target bending angle and the target turning angle in a case where the traveling direction of the displacement $z_b$ of the base 140 is a direction of backward movement.

Information about the target bending angle ($\theta_L$ or $\theta_L'$) and the target turning angle ($\zeta_L$ or $\zeta_L'$) of the most distal bending portion (leading bending portion) output from the switching unit 220 and information about the target bending angle $\theta_F'$ and the target turning angle $\zeta_F'$ of the following bending portion calculated by the angle calculation unit 210 are input to the kinematics calculation unit 230. Then, based on the input information, the kinematics calculation unit 230 calculates driving displacements caused by driving of wires of the most distal bending portion (leading bending portion) and the following bending portion, executed by respective actuators serving as driving units. In FIG. 18, driving displacements of the wires of the most distal bending portion (leading bending portion) and driving displacements of the wires of the following bending portion, acquired through the calculation executed by the kinematics calculation unit 230, are collectively described as driving displacements $l_p$ of wires. Then, bending control of the most distal bending portion (leading bending portion) and the following bending portion of the continuous robot 100 according to the present exemplary embodiment is executed depending on the driving displacements Ip of respective wires.

In the first to the third exemplary embodiments described above, a control method of the tail follow-up control of the continuous robot 100 in the xz plane is mainly described. In the present exemplary embodiment, tail follow-up control in a three-dimensional space will be described.

Kinematics are derived in order to acquire a driving displacement of the actuator for controlling the bending angle and the turning angle of the bending portion 170 of the continuous robot 100. Definitions of symbols are described as follows.

$l_d$: A length of a central axis of a bending portion.

$\theta_n$: A bending angle (of a distal end) of the n-th bending portion.

$\zeta_n$: A turning angle (of a distal end) of the n-th bending portion.

$\rho_n$: A curvature radius of the n-th bending portion.

$\zeta_{refn}$: A target turning angle (of a distal end) of the n-th bending portion.

Then, in the present exemplary embodiment, kinematics of the continuous robot 100 are derived based on the following assumptions.

1. In each of bending portions, wires are deformed at constant curvatures.
2. Torsional deformation of wires is not taken into consideration.
3. Wires are not deformed in a lengthwise direction.
4. Friction between a wire guide and a wire is not taken into consideration.

First, relationships between driving displacements $l_{p1a}$, $l_{p1b}$, and $l_{p1c}$ of wires a, b, and c of the first bending portion 170-1 and a bending angle $\theta_1$ and a turning angle $\zeta_1$ of the first bending portion 170-1 are expressed by the following formula (10).

[Formula 7]

$$l_{p1a} = -\frac{r_s}{\sqrt{3}}\cos\zeta_1\theta_1 \tag{10}$$

$$l_{p1b} = -\frac{r_s}{\sqrt{3}}\cos\left(\frac{2\pi}{3} - \zeta_1\right)\theta_1$$

$$l_{p1c} = -\frac{r_s}{\sqrt{3}}\cos\left(\frac{4\pi}{3} - \zeta_1\right)\theta_1$$

Next, relationships between driving displacements $l_{pna}$, $l_{pnb}$, and $l_{pnc}$ of wires a, b, and c of the n-th bending portion **170-*n* and a bending angle $\theta_n$ and a turning angle $\zeta_n$ of the n-th bending portion 170-*n* of the continuous robot having a plurality of bending portions are acquired. Further, the number of bending portions of the continuous robot 100** is specified as e, and a phase angle En of the wire for driving the n-th bending portion is expressed by the following formula (11).

[Formula 8]

$$\xi_n \frac{120}{e} n \tag{11}$$

Therefore, the driving displacements $l_{pna}$, $l_{pnb}$, and $l_{pnc}$ of the wires of the n-th bending portion **170-*n*** can be expressed by the following formulas (12).

[Formula 9]

$$l_{pna} = -\frac{r_s}{\sqrt{3}}\cos(\zeta_n - \xi_n)\theta_n \tag{12}$$

$$l_{pnb} = -\frac{r_s}{\sqrt{3}}\cos\left(\frac{2\pi}{3} - \zeta_n + \xi_n\right)\theta_n$$

$$l_{pnc} = -\frac{r_s}{\sqrt{3}}\cos\left(\frac{4\pi}{3} - \zeta_n + \xi_n\right)\theta_n$$

When the target bending angle $\theta_L$ and the target turning angle &t are input to the most distal bending portion (leading bending portion) **170-*e* from the input apparatus 320, the control apparatus 200 can control the angle of the most distal bending portion (leading bending portion) 170-*e* by acquiring the driving displacements of the wires through the formulas (12). Then, according to the tail follow-up control described in the present exemplary embodiment, a target bending angle can be interpolated and read from the storage unit 211 in a similar way to the tail follow-up control in the xz plane described in the first to the third exemplary embodiments, and a target turning angle can be calculated through the algorithm similar to the algorithm used for calculating a bending angle described in the first to the third exemplary embodiments by replacing a term "bending angle" with "turning angle". According to the present exemplary embodiment, it is possible to execute the tail follow-up control of the continuous robot 100 in a three-dimensional space by acquiring the driving displacements of wires for each of the bending portions 170** through the formulas (12).

Similar to the first exemplary embodiment described above, according to the fourth exemplary embodiment, a posture of the continuous robot 100 is appropriately controlled when the continuous robot 100 moves backward after moving forward, so that the continuous robot 100 can be prevented from being damaged.

Other Exemplary Embodiments

The present disclosure can also be realized through processing in which a program for realizing one or more functions according to the above-described exemplary embodiments is supplied to a system or an apparatus via a network or a storage medium, and one or more processors in the system or the apparatus read and execute the program. Further, the present disclosure can also be realized with a circuit (e.g., application specific integrated circuit (ASIC)) which implements one or more functions.

The program and a computer-readable storage medium storing this program are also included in the present disclosure.

In addition, the above-described exemplary embodiments are merely the examples embodying the present disclosure, and shall not be construed as limiting the technical range of the present disclosure. In other words, the present disclosure can be realized in diverse ways without departing from the technical spirit or main features of the present disclosure.

The present disclosure is not limited to the above embodiments and various changes and modifications can be made within the spirit and scope of the present disclosure. Therefore, to apprise the public of the scope of the present disclosure, the following claims are made.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to prevent the continuous robot from being damaged when the continuous robot moves backward after moving forward.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

The invention claimed is:

1. A continuous robot control system that executes control of a continuous robot comprising:

a base configured to make the continuous robot move forward and backward by moving;

a distal bending portion configured to bend by driving of distal linear members;

at least one actuator each configured to drive corresponding one of the distal linear members; and joining portions arranged between the distal bending portion and the base, the continuous robot control system comprising; and a controller configured to control the continuous robot to bring the continuous robot into a fourth state where the distal bending portion bends at a third bending angle between a second bending angle and a first bending angle with respect to a reference axis while the base is being located at a position between a third position and a first position, when the distal bending portion is extracted from a tube by making the continuous robot move backward, after the distal bending portion is inserted into an inner portion of the tube by changing a state of the continuous robot in order of a first state where the distal bending portion bends at the first bending angle with respect to the reference axis while the base of the continuous robot is being located at the first position, a second state where the base is being located at a second position by moving forward from the first position and the distal bending portion bends at the second bending angle different from the first bending angle with respect to the reference axis, and a third state where the base is located at the third position by moving forward from the second position, wherein the controller is further configured to control the continuous robot such that, after the base reaches a position further backward than the position in the fourth state in a backward movement, the distal bending portion bends at the first bending angle with respect to the reference axis, and wherein, during the backward movement of the base, a displacement amount of the base from a start to a completion of an angle change of the distal bending portion from the second bending angle to the first bending angle is larger than a displacement amount of the base from a start to a completion of an angle change of the distal bending portion from the first bending angle to the second bending angle during the forward movement.

2. The continuous robot control system according to claim 1, wherein the controller controls the continuous robot to bring the continuous robot into the fourth state where the base is located at a position between the second position and the first position.

3. The continuous robot control system according to claim 1, wherein the controller controls the continuous robot to bring the continuous robot into the fourth state where the base is located at a position between the third position and the second position.

4. The continuous robot control system according to claim 1, wherein, in a case where a distance between an original position and the second position of the base is shorter than a length of the distal bending portion, the controller sets the third bending angle to zero at the original position when the controller controls the continuous robot to bring the continuous robot into the fourth state.

5. The continuous robot control system according to claim 1, wherein, in a case where the controller is instructed to bring the continuous robot into the fourth state from the third state or the second state within a time shorter than a prescribed time, the controller limits a change rate of the third bending angle with respect to time.

6. The continuous robot control system according to claim 1, wherein the controller executes control of a turning angle of the distal bending portion, in addition to executing control of a bending angle of the distal bending portion for the first bending angle, the second bending angle, and the third bending angle.

7. The continuous robot control system according to claim 1, wherein the joining portions include a following bending portion following the distal bending portion, configured to bend by driving of following linear members, and wherein the actuator drives each of the following linear members independently of the distal linear members.

8. A control method of a continuous robot for executing control of a continuous robot comprising:

a base configured to make the continuous robot move forward and backward by moving;

a distal bending portion configured to bend by driving of distal linear members;

at least one actuator each configured to drive corresponding one of the distal linear members; and joining portions arranged between the distal bending portion and the base, the control method of the continuous robot comprising:

making the continuous robot move forward and backward; and controlling the continuous robot to bring the continuous robot into a fourth state where the distal bending portion bends at a third bending angle between a second bending angle and a first bending angle with respect to a reference axis while the base is being located at a position between a third position and a first position, when the distal bending portion is extracted from a tube by making the continuous robot move backward, after the distal bending portion is inserted into an inner portion of the tube by changing a state of the continuous robot in order of a first state where the distal bending portion bends at the first bending angle with respect to the reference axis while the base of the continuous robot is being located at the first position, a second state where the base is being located at a second position by moving forward from the first position and the distal bending portion bends at the second bending angle different from the first bending angle with respect to the reference axis, and a third state where the base is located at the third position by moving forward from the second position, wherein, in the controlling, the continuous robot is controlled such that, after the base reaches a position further backward than the position in the fourth state in a backward movement, the distal bending portion bends at the first bending angle with respect to the reference axis, and wherein, during the backward movement of the base, a displacement amount of the base from a start to a completion of an angle change of the distal bending portion from the second bending angle to the first bending angle is larger than a displacement amount of the base from a start to a completion of an angle change of the distal bending portion from the first bending angle to the second bending angle during the forward movement.

9. A non-transitory computer-readable storage medium storing a program for causing a computer to function as respective units of the continuous robot control system according to claim 1.

* * * * *